US012142798B1

United States Patent
Li et al.

(10) Patent No.: US 12,142,798 B1
(45) Date of Patent: Nov. 12, 2024

(54) ENERGY STORAGE DEVICE AND ELECTRICITY-CONSUMPTION DEVICE

(71) Applicants: Shenzhen Hithium Energy Storage Technology Co., Ltd., Shenzhen (CN); Xiamen Hithium Energy Storage Technology Co., Ltd., Fujian (CN)

(72) Inventors: Maosong Li, Shenzhen (CN); Jiben Tan, Shenzhen (CN)

(73) Assignees: Shenzhen Hithium Energy Storage Technology Co., Ltd., Shenzhen (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/762,454

(22) Filed: Jul. 2, 2024

(30) Foreign Application Priority Data

Aug. 16, 2023 (CN) .......................... 202311032157.8

(51) Int. Cl.
*H01M 50/15* (2021.01)
*H01M 50/103* (2021.01)
*H01M 50/586* (2021.01)

(52) U.S. Cl.
CPC ....... *H01M 50/586* (2021.01); *H01M 50/103* (2021.01); *H01M 50/15* (2021.01)

(58) Field of Classification Search
CPC ... H01M 50/586; H01M 50/103; H01M 50/15
See application file for complete search history.

(56) References Cited

FOREIGN PATENT DOCUMENTS

| CN | 208062159 U | 11/2018 |
|----|-------------|---------|
| CN | 208849034 U | 5/2019 |
| CN | 116073036 A | 5/2023 |
| CN | 219226564 U | 6/2023 |
| KR | 20210055543 A | 5/2021 |
| WO | 2023122971 A1 | 7/2023 |

OTHER PUBLICATIONS

CNIPA, Notification to Grant Patent Right for Invention for corresponding Chinese Patent Application No. 202311032157.8, Sep. 24, 2023, 12 pages.

*Primary Examiner* — Jane J Rhee
(74) *Attorney, Agent, or Firm* — IP Spring

(57) ABSTRACT

An energy storage device and an electricity-consumption device. The energy storage device includes an insulation film and an electrode assembly. The insulation film includes a bottom film, a first side film, and a second side film. The bottom film includes a first side, a second side, and a third side. In a length direction of the bottom film, the first side film at least partially exceeds the bottom film, and the second side film at least partially exceeds the bottom film. When the electrode assembly is wrapped by the insulation film, the first side film is folded relative to the bottom film along the first side, the second side film is folded relative to the bottom film along the second side, a second wrapping section is folded relative to a first wrapping section, and a fourth wrapping section is folded relative to a third wrapping section.

18 Claims, 9 Drawing Sheets

ENERGY STORAGE DEVICE AND ELECTRICITY-CONSUMPTION DEVICE

CROSS-REFERENCE TO RELATED APPLICATIONS

This application claims priority under 35 U.S.C. § 119 (a) to and the benefit of Chinese Patent Application No. 202311032157.8, filed Aug. 16, 2023, the entire disclosure of which is incorporated herein by reference.

TECHNICAL FIELD

The present disclosure relates to the field of energy storage technology, in particular, to an energy storage device and an electricity-consumption device.

BACKGROUND

A secondary battery, also known as a rechargeable battery or a storage battery, refers to a battery that can be charged to activate active substance of the battery for reuse after the battery is discharged. Since the secondary battery is reusable, the secondary battery gradually serves as a main power source for electricity-consumption devices. As the demand for the secondary battery gradually increases, people have increasingly higher requirements for various performances of the secondary battery.

For a secondary battery, a layer of thin film used for insulation is usually needed around the periphery of a battery cell. However, an existing insulation film is relatively difficult to manufacture, and it is relatively difficult to assemble the insulation film with the battery cell. Therefore, how to provide an insulation film that is easy to manufacture and easy to assemble with the battery cell is the key to this problem.

SUMMARY

In a first aspect, an energy storage device is provided in the disclosure. The energy storage device includes an insulation film and an electrode assembly. The electrode assembly is wrapped by the insulation film, and the insulation film includes a bottom film, a first side film, and a second side film. The bottom film includes a first side, a second side, and a third side. The first side is opposite to the second side in a width direction of the bottom film, and the third side is connected to the first side and the second side. The first side film is connected to the first side, and the first side film includes a first wrapping section and a second wrapping section connected to the first wrapping section in a length direction of the bottom film. The first wrapping section is connected to the first side, and the second wrapping section exceeds the third side in the length direction of the bottom film. The second side film is connected to the second side, and the second side film includes a third wrapping section and a fourth wrapping section connected to the third wrapping section in the length direction of the bottom film. The third wrapping section is connected to the second side, and the fourth wrapping section exceeds the third side in the length direction of the bottom film. The bottom film, the first side film, and the second side film are integrally formed. When the electrode assembly is wrapped by the insulation film, the first side film is folded relative to the bottom film along the first side, the second side film is folded relative to the bottom film along the second side, the second wrapping section is folded relative to the first wrapping section, the fourth wrapping section is folded relative to the third wrapping section, and the second wrapping section and the fourth wrapping section are connected and at least partially overlapped. A first groove and a second groove are defined on the third side, the first groove extends along the first side, and the second groove extends along the second side. The first groove is defined between the bottom film and the first side film, and the second groove is defined between the bottom film and the second side film. The first side film further includes a first bending section defined by the first groove, and the second side film further includes a second bending section defined by the second groove. In the length direction of the bottom film, two opposite sides of the first bending section are respectively connected to the first wrapping section and the second wrapping section, and two opposite sides of the second bending section are respectively connected to the third wrapping section and the fourth wrapping section. When the electrode assembly is wrapped by the insulation film, the first bending section and the second bending section are bent and deformed to make the second wrapping section folded relative to the first wrapping section and the fourth wrapping section folded relative to the third wrapping section. The second wrapping section has a first cutting edge facing away from the first wrapping section and close to the fourth wrapping section, and the fourth wrapping section has a second cutting edge facing away from the third wrapping section and close to the second wrapping section. The first cutting edge is angled relative to the third side, and the second cutting edge is angled relative to the third side. The first cutting edge and the third side define an angle $\alpha$, and the second cutting edge and the third side define an angle $\beta$, where $1°\leq\alpha\leq8°$, and $1°\leq\beta\leq8°$. In the length direction of the bottom film, the first bending section has a length M1, and the second bending section has a length M2, where $1.75\text{ mm}\leq M1\leq 10.35\text{ mm}$, and $0.9\leq M1/M2\leq 1.1$. In the width direction of the bottom film, the bottom film further includes a third bending section and a fourth bending section facing away from each other. The first side is located at the third bending section, and the second side is located at the fourth bending section. In the width direction of the bottom film, the third bending section has a width M3, and the fourth bending section has a width M4, where $1\text{ mm}\leq M3\leq 2.55\text{ mm}$, and $0.9\leq M3/M4\leq 1.1$. The energy storage device further includes a cover plate, a lower plastic, and a housing. The cover plate includes a first outer side surface and a second outer side surface that are connected at an angle. The lower plastic is connected to the cover plate. The lower plastic includes a third outer side surface facing the same direction as the first outer side surface, and a fourth outer side surface facing the same direction as the second outer side surface. The third outer side surface is connected to the fourth outer side surface, the first outer side surface exceeds the third outer side surface, and the second outer side surface exceeds the fourth outer side surface. The third outer side surface has a first bonding region, the fourth outer side surface has a second bonding region, and the insulation film is connected to the first bonding region and the second bonding region. In a thickness direction of the lower plastic, the first bonding region is located at an end of the third outer side surface away from the cover plate, and the second bonding region is located at an end of the fourth outer side surface away from the cover plate. An edge of the first bonding region is spaced apart from the cover plate by a distance S1, where $1.55\text{ mm}\leq S1\leq 2.85\text{ mm}$.

In a second aspect, an electricity-consumption device is provided in the disclosure. The electricity-consumption device includes an energy storage device, and the energy storage device is configured to provide electrical energy for the electricity-consumption device. The energy storage device includes an insulation film and an electrode assembly. The electrode assembly is wrapped by the insulation film, and the insulation film includes a bottom film, a first side film, and a second side film. The bottom film includes a first side, a second side, and a third side. The first side is opposite to the second side in a width direction of the bottom film, and the third side is connected to the first side and the second side. The first side film is connected to the first side, and the first side film includes a first wrapping section and a second wrapping section connected to the first wrapping section in a length direction of the bottom film. The first wrapping section is connected to the first side, and the second wrapping section exceeds the third side in the length direction of the bottom film. The second side film is connected to the second side, and the second side film includes a third wrapping section and a fourth wrapping section connected to the third wrapping section in the length direction of the bottom film. The third wrapping section is connected to the second side, and the fourth wrapping section exceeds the third side in the length direction of the bottom film. The bottom film, the first side film, and the second side film are integrally formed. When the electrode assembly is wrapped by the insulation film, the first side film is folded relative to the bottom film along the first side, the second side film is folded relative to the bottom film along the second side, the second wrapping section is folded relative to the first wrapping section, the fourth wrapping section is folded relative to the third wrapping section, and the second wrapping section and the fourth wrapping section are connected and at least partially overlapped. A first groove and a second groove are defined on the third side, the first groove extends along the first side, and the second groove extends along the second side. The first groove is defined between the bottom film and the first side film, and the second groove is defined between the bottom film and the second side film. The first side film further includes a first bending section defined by the first groove, and the second side film further includes a second bending section defined by the second groove. In the length direction of the bottom film, two opposite sides of the first bending section are respectively connected to the first wrapping section and the second wrapping section, and two opposite sides of the second bending section are respectively connected to the third wrapping section and the fourth wrapping section. When the electrode assembly is wrapped by the insulation film, the first bending section and the second bending section are bent and deformed to make the second wrapping section folded relative to the first wrapping section and the fourth wrapping section folded relative to the third wrapping section. The second wrapping section has a first cutting edge facing away from the first wrapping section and close to the fourth wrapping section, and the fourth wrapping section has a second cutting edge facing away from the third wrapping section and close to the second wrapping section. The first cutting edge is angled relative to the third side, and the second cutting edge is angled relative to the third side. The first cutting edge and the third side define an angle $\alpha$, and the second cutting edge and the third side define an angle $\beta$, where $1°\leq\alpha\leq8°$, and $1°\leq\beta\leq8°$. In the length direction of the bottom film, the first bending section has a length M1, and the second bending section has a length M2, where $1.75\ mm\leq M1\leq10.35\ mm$, and $0.9\leq M1/M2\leq1.1$. In the width direction of the bottom film, the bottom film further includes a third bending section and a fourth bending section facing away from each other. The first side is located at the third bending section, and the second side is located at the fourth bending section. In the width direction of the bottom film, the third bending section has a width M3, and the fourth bending section has a width M4, where $1\ mm\leq M3\leq2.55\ mm$, and $0.9\leq M3/M4\leq1.1$. The energy storage device further includes a cover plate, a lower plastic, and a housing. The cover plate includes a first outer side surface and a second outer side surface that are connected at an angle. The lower plastic is connected to the cover plate. The lower plastic includes a third outer side surface facing the same direction as the first outer side surface, and a fourth outer side surface facing the same direction as the second outer side surface. The third outer side surface is connected to the fourth outer side surface, the first outer side surface exceeds the third outer side surface, and the second outer side surface exceeds the fourth outer side surface. The third outer side surface has a first bonding region, the fourth outer side surface has a second bonding region, and the insulation film is connected to the first bonding region and the second bonding region. In a thickness direction of the lower plastic, the first bonding region is located at an end of the third outer side surface away from the cover plate, and the second bonding region is located at an end of the fourth outer side surface away from the cover plate. An edge of the first bonding region is spaced apart from the cover plate by a distance S1, where $1.55\ mm\leq S1\leq2.85\ mm$.

BRIEF DESCRIPTION OF THE DRAWINGS

In order to describe technical solutions in the related art or embodiments of the disclosure more clearly, the following will give a brief introduction to the accompanying drawings required for describing the related art or embodiments. Apparently, the accompanying drawings hereinafter described are merely some embodiments of the disclosure. Based on these drawings, those of ordinary skill in the art can also obtain other drawings without creative effort.

Figure 1:
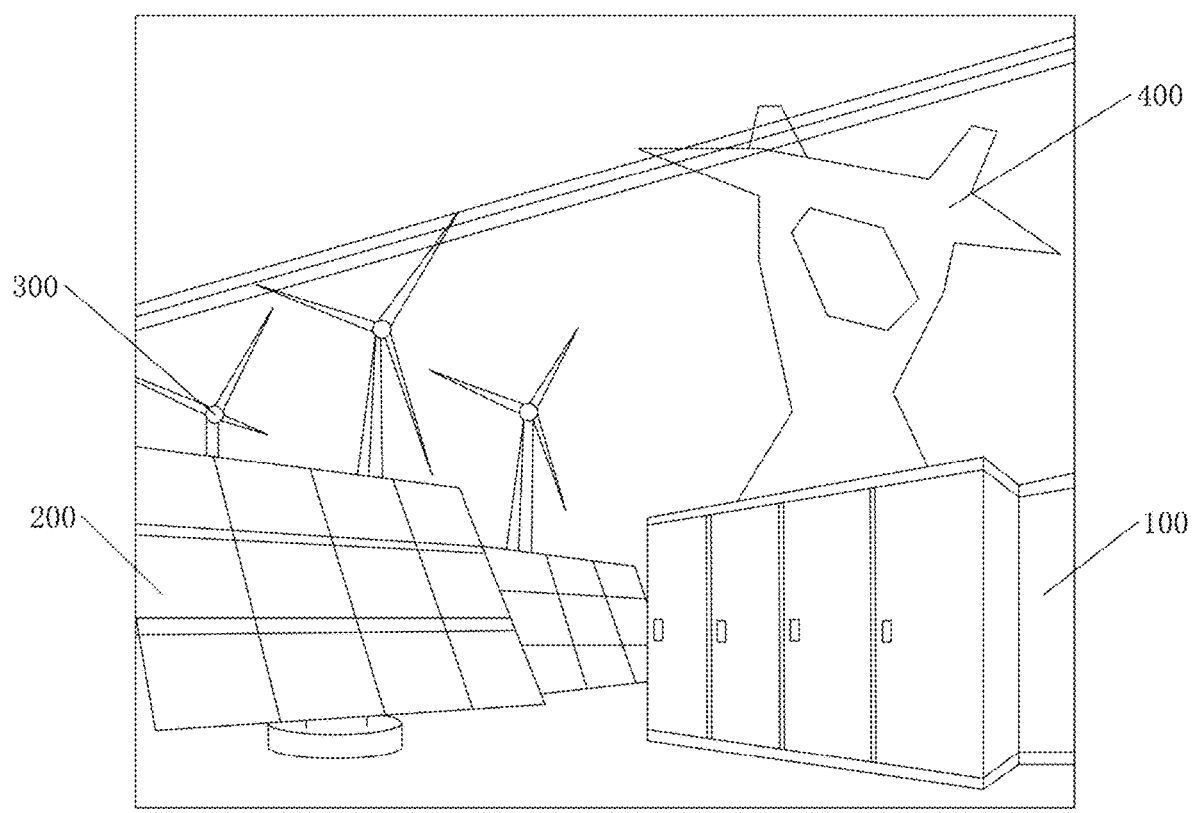
FIG. 1 is a schematic diagram of an energy storage device provided in an embodiment in a household energy storage facility.

Explanation of reference signs: 100—energy storage device; 200—photovoltaic panel; 300—wind turbine; 400—electricity-consumption device; 10—end cap assembly; 11—cover plate; 111—first outer side surface; 112—second outer side surface; 113—first curved surface; 12—lower plastic; 121—third outer side surface; A—first bonding region; 122—fourth outer side surface; B—second bonding region; 123—second curved surface; 20—housing; 30—electrode assembly; 301—battery cell; 302—positive tab; 303—negative tab; 40—insulation film; 41—bottom film; 411—first side; 412—second side; 413—third side; 414—fourth side; 415—first groove; 4151—first inner side; 4152—second inner side; 4153—first inner curved side; 416—second groove; 417—positioning hole; 417A—first positioning hole; 417B—second positioning hole; 418—third bending section; 419—fourth bending section; 42—first side film; 421—first wrapping section; 422—second wrapping section; 4221—fifth side; 4222—first cutting edge; 4223—sixth side; 423—fifth wrapping section; 424—first bending section; 43—second side film; 431—third wrapping section; 432—fourth wrapping section; 4321—second cutting edge; 433—sixth wrapping section; 434—second bending section; X—length direction; Y—width direction; Z—thickness direction; 50—bottom support plate.

DETAILED DESCRIPTION

The following will illustrate technical solutions of embodiments of the disclosure with reference to the accompanying drawings of embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

It may be noted that, when a component is referred to be "fixed to" another component, the component can be directly disposed on another component or there can be a median component between these two components. When a component is considered to be "connected to" another component, the component can be directly connected to another component or there may be a median component between these two components.

Unless otherwise defined, all technical and scientific terms used herein have the same meaning as commonly understood by those of ordinary skill in the art of the present disclosure. The terms used herein in the disclosure are for the purpose of describing embodiments only and are not intended to limit the disclosure. The term "and/or" used in the disclosure includes any and all combinations of one or more related listed items.

The following will describe embodiments with reference to the accompanying drawings in detail. Embodiments and technical solutions described in various embodiments can be combined with each other without conflict.

Since energy required by people has strong temporal and spatial characteristics, in order to use energy in a reasonable manner and improve energy utilization, a medium or a device is required to store energy in the same energy form or in another energy form converted and then to release energy in a specific energy form based on requirements of future applications.

At present, generation of green electrical energy is generally dependent on photovoltaics, wind power, water potential, and the like. However, in general, wind energy, solar energy, and the like are strongly intermittent and volatile, resulting in an unstable power grid, insufficient power supply at a power consumption peak, and overmuch power supply at a power consumption valley. In addition, an unstable voltage may further damage electric power. Therefore, "abandoned wind and abandoned light" may occur due to insufficient power demand or insufficient power-grid admitting ability, and energy storage is required to solve these problems. That is, electrical energy is stored by converting it into other forms of energy by physical or chemical means, and energy is released by converting it into electrical energy when needed. In brief, energy storage is similar to a large "power bank", which stores electrical energy when photovoltaics and wind energy are sufficient and releases stored electric power when needed.

Taking electrochemical energy storage as an example, an energy storage device is provided in the disclosure. The energy storage device includes one group of chemical batteries. Chemical elements in the chemical batteries can be used as an energy storage medium to implement a charging/discharging process through chemical reaction or change of the energy storage medium. In brief, electrical energy generated by solar energy and wind energy is stored in the chemical batteries. When the usage of external electrical energy reaches a peak, the power stored in the chemical batteries is released for use, or is transferred to a place where the power is scarce for reuse.

At present, energy storage may be applied in various application scenarios, including (wind/solar) power-generation-side energy storage, grid-side energy storage, base-station-side energy storage, user-side energy storage, etc. Corresponding types of energy storage devices include the following.

(1) A large-sized energy storage container applied in a grid-side energy-storage scenario. The energy storage container may serve as a high-quality active and reactive regulation power source in the grid, which can realize matching of electric energy loads in time and space, enhance the capacity for integration of renewable energy, and is of great significance in the backup of the grid system, relieving the pressure of power supply at a peak load, and peak shaving and frequency modulation.

(2) A small and medium-sized energy storage cabinet applied in a user-side industrial and commercial energy-storage scenario (banks, shopping malls, etc.). The small and medium-sized energy storage cabinet mainly operates in a "peak shaving and valley filling" mode. Based on the demand for electricity, there may be a significant price difference in electricity prices at peak and valley periods. In order to reduce cost, an energy storage cabinet/box may be charged during an electricity-price valley period, and the electricity in the energy storage device may be released for use during the electricity-price peak period to save electricity cost.

The purpose of the disclosure is to provide an energy storage device and an electricity-consumption device.

To achieve the purpose of the disclosure, the following technical solutions are provided.

In a first aspect, an energy storage device is provided in the disclosure. The energy storage device includes an insulation film and an electrode assembly. The electrode assembly is wrapped by the insulation film, and the insulation film includes a bottom film, a first side film, and a second side film. The bottom film includes a first side, a second side, and a third side. The first side is opposite to the second side in a width direction of the bottom film, and the third side is connected to the first side and the second side. The first side film is connected to the first side, and the first side film includes a first wrapping section and a second wrapping section connected to the first wrapping section in a length direction of the bottom film. The first wrapping section is connected to the first side, and the second wrapping section exceeds the third side in the length direction of the bottom film. The second side film is connected to the second side, and the second side film includes a third wrapping section and a fourth wrapping section connected to the third wrapping section in the length direction of the bottom film. The third wrapping section is connected to the second side, and the fourth wrapping section exceeds the third side in the length direction of the bottom film. The bottom film, the first side film, and the second side film are integrally formed. When the electrode assembly is wrapped by the insulation film, the first side film is folded relative to the bottom film along the first side, the second side film is folded relative to the bottom film along the second side, the second wrapping section is folded relative to the first wrapping section, the fourth wrapping section is folded relative to the third wrapping section, and the second wrapping section and the fourth wrapping section are connected and at least partially overlapped. A first groove and a second groove are defined on the third side, the first groove extends along the first side, and the second groove extends along the second side. The first groove is defined between the bottom film and the first side film, and the second groove is defined between the bottom film and the second side film. The first side film further includes a first bending section defined by the first groove, and the second side film further comprises a second bending section defined by the second groove. In the length direction of the bottom film, two opposite sides of the first bending section are respectively connected to the first wrapping section and the second wrapping section, and two opposite sides of the second bending section are respectively connected to the third wrapping section and the fourth wrapping section. When the electrode assembly is wrapped by the insulation film, the first bending section and the second bending section are bent and deformed to make the second wrapping section folded relative to the first wrapping section and the fourth wrapping section folded relative to the third wrapping section.

In the disclosure, the bottom film, the first side film, and the second side film of the insulation film are integrally formed, which allows the whole insulation film to be manufactured as an integrally formed structure by means of hot-pressing, casting, etc. Then a portion of the first side film exceeding the bottom film and a portion of the second side film exceeding the bottom film can be manufactured by means of super speed cutting. That the insulation film is of an integrally formed structure not only reduces excessive materials of the insulation film, but also enables multiple insulation films to be integrally formed and divided into multiple insulation films by cutting continuously, thereby improving the manufacturing efficiency of the insulation film. In addition, a battery cell is wrapped by the whole insulation film, which is convenient for operators to perform the positioning during the assembly.

Moreover, the first groove and the second groove are defined, so that the bottom film does not have a sharp corner, and a separator of a wound electrode assembly may be prevented from being pierced or scratched by the bottom film during the wrapping process. In this way, the product yield and the working efficiency may be improved, and the manufacturing cost of the energy storage device may be further reduced. With the first bending section defined by the first groove and the second bending section defined by the second groove, a degree of freedom for bending is provided for the wrapping sections when the wrapping sections are folded, and thus a sharp bending angle and a bending interference may be avoided.

In an embodiment, the second wrapping section has a first cutting edge facing away from the first wrapping section and close to the fourth wrapping section, and the fourth wrapping section has a second cutting edge facing away from the third wrapping section and close to the second wrapping section. The first cutting edge is angled relative to the third side, and the second cutting edge is angled relative to the third side.

In the disclosure, the second wrapping section has the first cutting edge and the fourth wrapping section has the second cutting edge, so that the second wrapping section and the fourth wrapping section may be prevented from squeezing each other after being folded, and thus a jamming may be prevented, and a process of manual smoothing may be reduced. Further, during the process of wrapping the insulation film, the first cutting edge and the second cutting edge can guide the repositioning of a mismatching portion of the second wrapping section and a mismatching portion of the fourth wrapping section. In this way, operators may wrap the insulation film more conveniently.

In an embodiment, the first cutting edge and the third side define an angle $\alpha$, and the second cutting edge and the third side define an angle $\beta$, where $1°\leq\alpha\leq8°$ and $1°\leq\beta\leq8°$. By setting the angle defined by the first cutting edge and the third side and the angle defined by the second cutting edge and the third side within the above range, the mismatching portion of the second wrapping section and the mismatching portion of the fourth wrapping section may be guided to be repositioned during the process of wrapping the insulation film, so that operators may wrap the insulation film more conveniently. By setting the angles within the above range, a problem of exposing the battery cell caused by over cutting the insulation film may be prevented.

In an embodiment, a bottom wall of the first groove and a bottom wall of the second groove each have an arc-shaped contour.

Since the bottom wall of the first groove and the bottom wall of the second groove are arc-shaped, an occurrence of a sharp bending angle may be further reduced. In this way, an accidental tearing of the insulation film during the process of wrapping by operators may be avoided, thereby improving the product yield and the working efficiency, and reducing the manufacturing cost of the energy storage device.

In an embodiment, the first side is connected to the third side in an arc connection manner, and the second side is connected to the third side in an arc connection manner. Since the first side is connected to the third side in an arc connection manner and the second side is connected to the third side in an arc connection manner, the first side does not have a sharp corner after the first groove and the second groove are defined. In this way, an occurrence of a sharp bending angle may be further reduced, and thus an accidental tearing of the insulation film during the process of wrapping by operators may be avoided, thereby improving the product yield and the working efficiency, and reducing the manufacturing cost of the energy storage device.

In an embodiment, the energy storage device further includes a bottom support plate. The bottom film defines a positioning hole penetrating the bottom film, and the positioning hole is configured to position and install the bottom support plate. The positioning hole is a circular hole, and the positioning hole satisfies: $0.9\leq(L1-R1)/(L2-R1)\leq1.1$, where R1 is a radius of the positioning hole, and in the width direction of the bottom film, L1 is a distance from a center of the positioning hole to the first side and L2 is a distance from the center of the positioning hole to the second side. By setting the distance from the positioning hole to the first side and the distance from the positioning hole to the second side to satisfy the above relation, it can be ensured that there is no installation deviation during the assembly of the insulation film and the battery cell. In this way, errors may be further reduced during the assembly.

In an embodiment, in the length direction of the bottom film, the second wrapping section exceeds the third side by a length N1, where 20 mm≤N1≤40 mm. The length N1 of part of the second wrapping section exceeding the third side is within the above range, so that the second wrapping section and the fourth wrapping section may be partially overlapped after the insulation film is folded. Moreover, since the second wrapping section and the fourth wrapping section are similar in size, the battery cell may be prevented from being wrapped incompletely.

In an embodiment, the fourth wrapping section exceeds the third side by a length N2, and in the width direction of the bottom film, a length Y1 of the third side satisfies: 1.25≤(N1+N2)/Y1≤1.75. The above relation being satisfied can ensure that the second wrapping section and the fourth wrapping section are able to completely wrap the battery cell, and can also ensure that the second wrapping section and the fourth wrapping section are not too long. In this way, the wrapping sections may be prevented from curling up caused by the excess insulation film.

In an embodiment, the first side film further includes a first bending section, and the second side film further includes a second bending section. In the length direction of the bottom film, two opposite sides of the first bending section are respectively connected to the first wrapping section and the second wrapping section, and two opposite sides of the second bending section are respectively connected to the third wrapping section and the fourth wrapping section. In the length direction of the bottom film, the first bending section has a length M1, where 1.75 mm≤M1≤10.35 mm. When the electrode assembly is wrapped by the insulation film, the first bending section and the second bending section are bent and deformed to make the second wrapping section folded relative to the first wrapping section and the fourth wrapping section folded relative to the third wrapping section.

The first bending section with a length within the above range is disposed between the first wrapping section and the second wrapping section, so that the second wrapping section can have a certain degree of freedom for bending when the second wrapping section is bent relative to the first wrapping section. In this way, precision requirements for bending can be reduced. Further, by limiting the first bending section and the second bending section to satisfy the above relation, the first bending section and the second bending section may be similar in size, which not only leaves a range of allowable error in cutting the insulation film, but also ensures that the first bending section and the second bending section are not too short. In this way, the battery cell may be prevented from being wrapped incompletely by the second wrapping section or the fourth wrapping section.

In an embodiment, 2 mm≤M1≤6.25 mm, which further limits the length M1 of the first bending section. In this way, the size of the insulation film may be reduced while ensuring a degree of freedom for bending, and materials and the manufacturing cost may be saved while achieving the same effect.

In an embodiment, in the width direction of the bottom film, the bottom film further includes a third bending section and a fourth bending section facing away from each other. The first side is located at the third bending section, the second side is located at the fourth bending section, and in the width direction of the bottom film, the third bending section has a width M3, where 1 mm≤M3≤2.55 mm.

The third bending section with a length within the above range is disposed on the bottom film, so that the first side film can have a certain degree of freedom for bending when the first side film is bent relative to the bottom film. In this way, precision requirements for bending can be reduced. Further, by limiting the third bending section and the fourth bending section to satisfy the above relation, the third bending section and the fourth bending section may be similar in size, which not only leaves a range of allowable error in cutting the insulation film, but also ensures that the third bending section and the fourth bending section are not too short. In this way, the battery cell may be prevented from being wrapped incompletely by the first side film or the second side film.

In an embodiment, the energy storage device further includes a cover plate, a lower plastic, and a housing. The cover plate includes a first outer side surface and a second outer side surface that are connected at an angle. The lower plastic is connected to the cover plate. The lower plastic comprises a third outer side surface facing the same direction as the first outer side surface and a fourth outer side surface facing the same direction as the second outer side surface. The third outer side surface is connected to the fourth outer side surface, the first outer side surface exceeds the third outer side surface, and the second outer side surface exceeds the fourth outer side surface. The electrode assembly is connected to the lower plastic, and the electrode assembly is wrapped by the insulation film. The electrode assembly, the insulation film, and the lower plastic are accommodated in the housing, and the housing is connected to the cover plate. The cover plate further includes a first curved surface, and the lower plastic further includes a second curved surface. Two ends of the first curved surface are respectively connected to the first outer side surface and the second outer side surface, and two ends of the second curved surface are respectively connected to the third outer side surface and the fourth outer side surface. The first curved surface exceeds the second curved surface, a distance between the first curved surface and the second curved surface is H3, and the cover plate and the lower plastic satisfy: 1.15<H3/H1≤1.85.

The lower plastic includes the second curved surface, so that the second curved surface can connect to the first bending section or the second bending section in the above embodiments. That is, the first bending section or the second bending section may be bent along the second curved surface, and then fixed by welding connection. Further, by setting the parameter of the second curved surface within the above range, a bending position of the insulation film may be prevented from bulging caused by the bending position being too far away from a jelly roll, thereby avoiding a situation where the electrode assembly wrapped by the insulation film is unable to be accommodated in the housing due to interference between the insulation film and the inner wall of the housing.

In an embodiment, the first wrapping section or the third wrapping section is connected to the third outer side surface, and the second wrapping section and the fourth wrapping section are both connected to the fourth outer side surface. The second wrapping section and the fourth wrapping section are connected and at least partially overlapped. In a width direction of the cover plate, a distance between the first outer side surface and the third outer side surface is H1. In a length direction of the cover plate, a distance between the second outer side surface and the fourth outer side surface is H2. The cover plate and the lower plastic satisfy: 1<H2/H1≤1.25.

The first outer side surface and the third outer side surface are spaced apart, and the second outer side surface and the fourth outer side surface are spaced apart, so that a certain amount of accommodating space is provided for wrinkles of the insulation film that appear after the insulation film is welded, and wrinkles of the insulation film may be prevented from scratching the housing, thereby avoiding a cracking at a welding point. In this way, the risk of the insulation film detaching from the side of the lower plastic may be lowered, and the energy density of the energy storage device may be improved. Moreover, setting the distance H1 and the distance H2 within the above range can ensure that a larger accommodating space is provided for the two-layer film structure formed by the overlap of the second wrapping section and the fourth wrapping section, thereby reducing the risk of the insulation film on the fourth outer side surface detaching from the lower plastic.

In an embodiment, the third outer side surface has a first bonding region, the fourth outer side surface has a second bonding region, and the insulation film is connected to the first bonding region and the second bonding region. In a thickness direction of the lower plastic, the first bonding region is located at an end of the third outer side surface away from the cover plate, the second bonding region is located at an end of the fourth outer side surface away from the cover plate, and an edge of the first bonding region is spaced apart from the cover plate by a distance S1, where 1.55 mm≤S1≤2.85 mm.

On the basis of the above embodiments, since the insulation film will wrinkle, the welding point being too close to the cover plate will cause wrinkles to be too close to the cover plate. In this case, wrinkles of the insulation film may be partially clamped by the housing and the cover plate after the housing is connected to the cover plate. Therefore, a gap will appear between the housing and the cover plate, which will lead to air leakage inside the housing. When the above range is satisfied, the first bonding region and the second bonding region are at similar heights, so that the insulation film after welding may support the battery cell without being askew, thereby further avoiding uneven stress on the insulation film and ensuring that the battery cell will not come off from the support of the insulation film.

In a second aspect, an electricity-consumption device is provided in the disclosure. The electricity-consumption device includes the energy storage device of the first aspect, and the energy storage device is configured to provide electrical energy for the electricity-consumption device.

Figure 2:
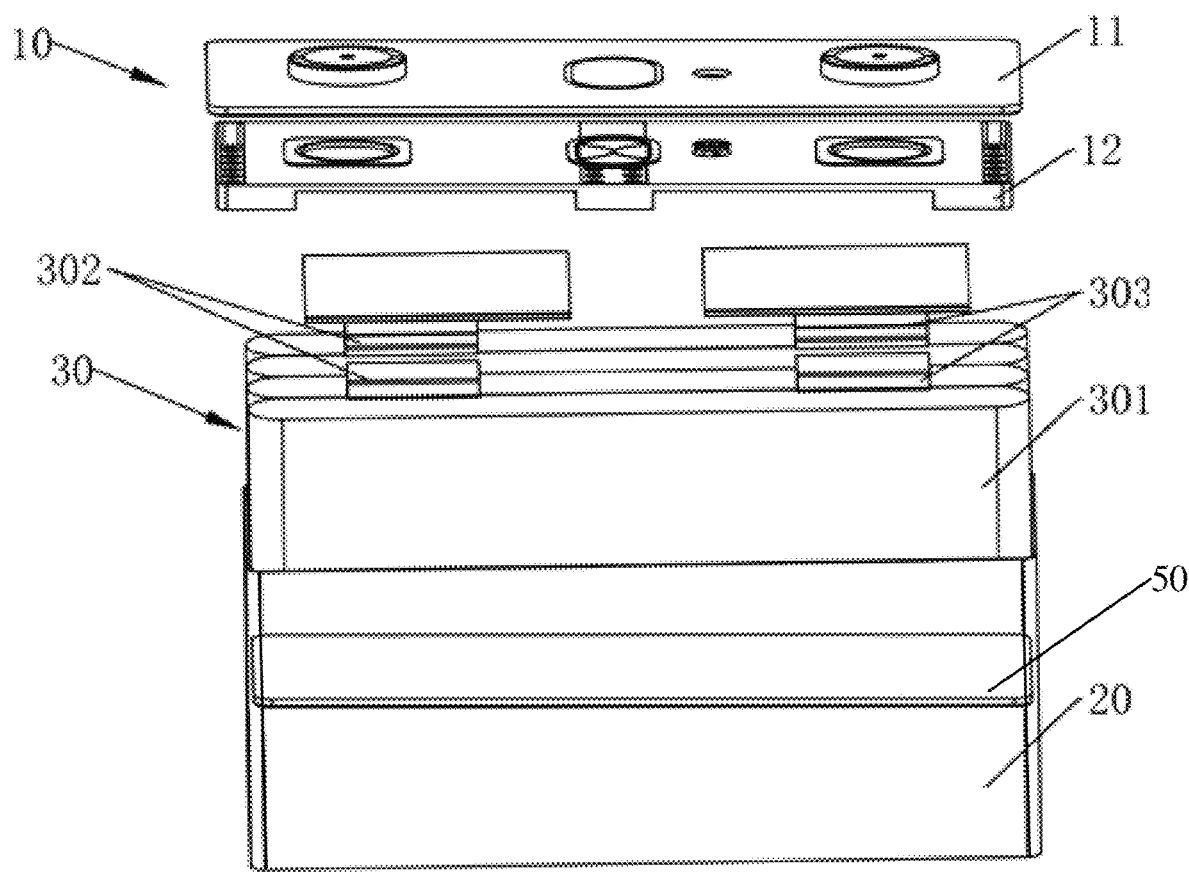
FIG. 2 is an exploded view of an energy storage device provided in an embodiment.

Reference is made to FIG. 1 and FIG. 2, an energy storage device provided in embodiments of the disclosure is applied to an energy storage system. The energy storage system includes an electrical energy conversion device (photovoltaic panel 200), a wind energy conversion device (wind turbine 300), an electricity-consumption device 400 (power grid), and an energy storage device 100. The energy storage device 100 may serve as an energy storage cabinet, which may be installed outdoors. Specifically, the photovoltaic panel 200 can convert solar energy into electrical energy during the electricity-price valley period, and the energy storage device 100 is configured to store the electrical energy and provide the electrical energy to the power grid during a power-consumption peak period, or supply electricity when there is an outage/blackout in the power grid. The wind energy conversion device (wind turbine 300) can convert wind energy into electrical energy, and the energy storage device 100 is configured to store the electrical energy and provide the electrical energy to the power grid during the power-consumption peak period, or supply electricity when there is an outage/blackout in the power grid. The electrical energy may be transmitted using a high voltage cable.

There may be multiple energy storage devices 100, which are connected in series or in parallel. The multiple energy storage devices 100 are supported and electrically connected by means of a separating plate (not illustrated in the drawings). In this embodiment, the term "multiple" refers to two or more than two. An energy storage box may be disposed outside the energy storage device 100, which is used to accommodate the energy storage device 100.

It may be understood that, the energy storage device 100 may include but is not limited to a cell, a battery module, a battery pack, a battery system, etc. The actual application form of the energy storage device 100 provided in embodiments of the disclosure may be, but is not limited to, the above-listed products, or may be other application forms. Embodiments of the disclosure do not impose strict restrictions on the application form of the energy storage device 100. For illustrative purposes, in embodiments of the disclosure, the energy storage device 100 is a multi-cell battery.

Reference is made to FIG. 2, the energy storage device 100 includes a housing 20, an electrode assembly 30, and an end cap assembly 10. The electrode assembly 30 includes a battery cell 301, a positive tab 302, and a negative tab 303. The positive tab 302 and the negative tab 303 are connected to the battery cell 301. The electrode assembly 30 is disposed inside the housing 20, and an opening of the housing 20 is sealed by the end cap assembly 10. Optionally, the battery cell 301 is of a rectangular structure, which includes, a bottom surface and a top surface opposite to each other, a first broad surface and a second broad surface opposite to each other, and a first side surface and a second side surface opposite to each other.

Figure 3:
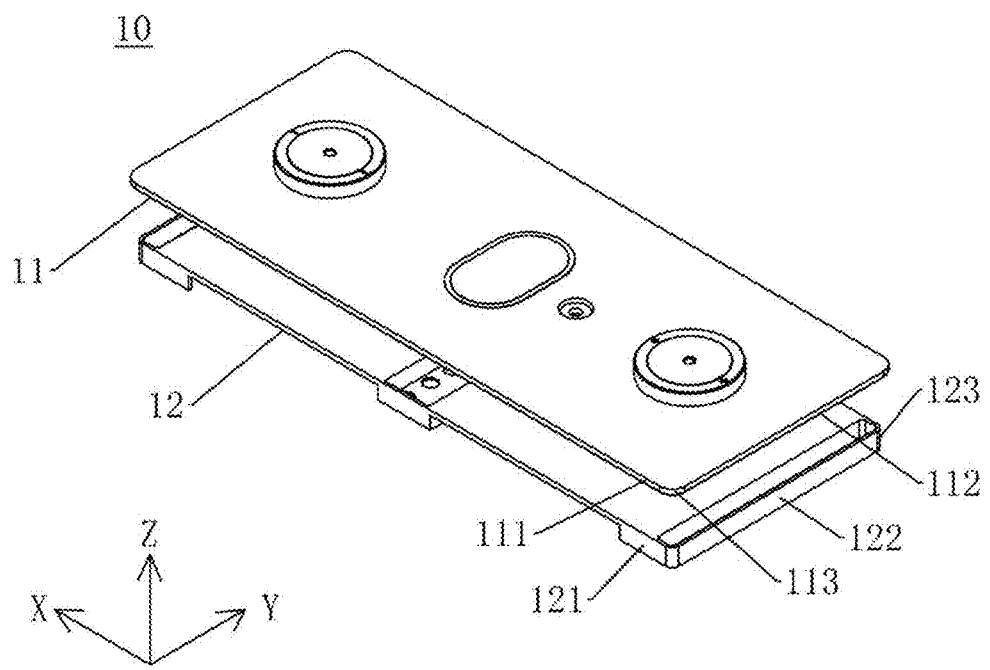
FIG. 3 is an exploded view of an end cap assembly provided in an embodiment.

In an embodiment, reference is made to FIG. 2 and FIG. 3, the end cap assembly 10 includes a cover plate 11 and a lower plastic 12 connected to each other. The cover plate 11 and the lower plastic 12 are disposed in sequence in a thickness direction Z of the energy storage device 100. The lower plastic 12 is connected to the battery cell 301, then the lower plastic 12 and the battery cell 301 connected each other are put into the housing 20 together, and the opening of the housing 20 is sealed by the cover plate 11.

Figure 4:
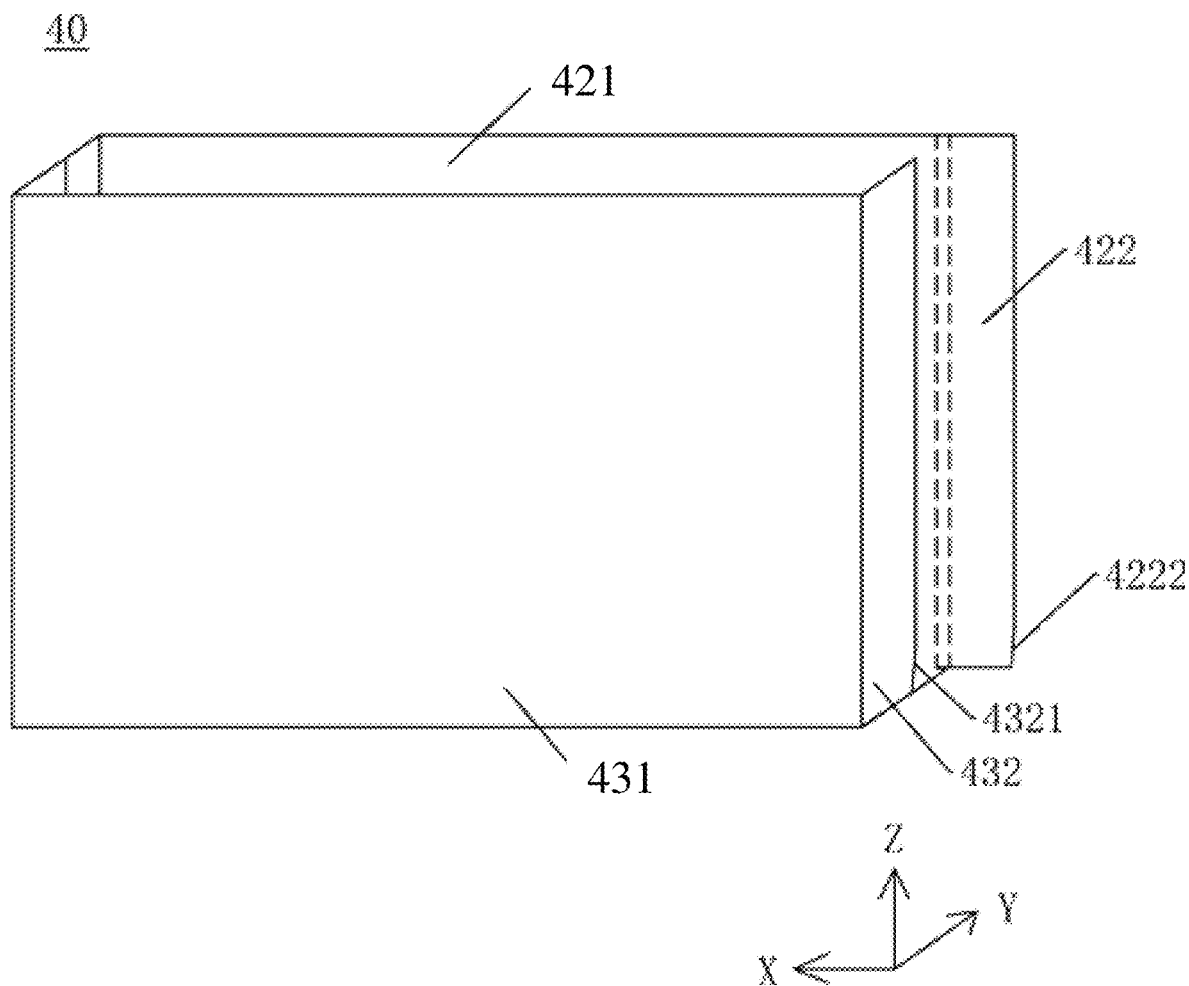
FIG. 4 is a schematic view of an appearance of an insulation film after being folded provided in an embodiment.
Figure 5:
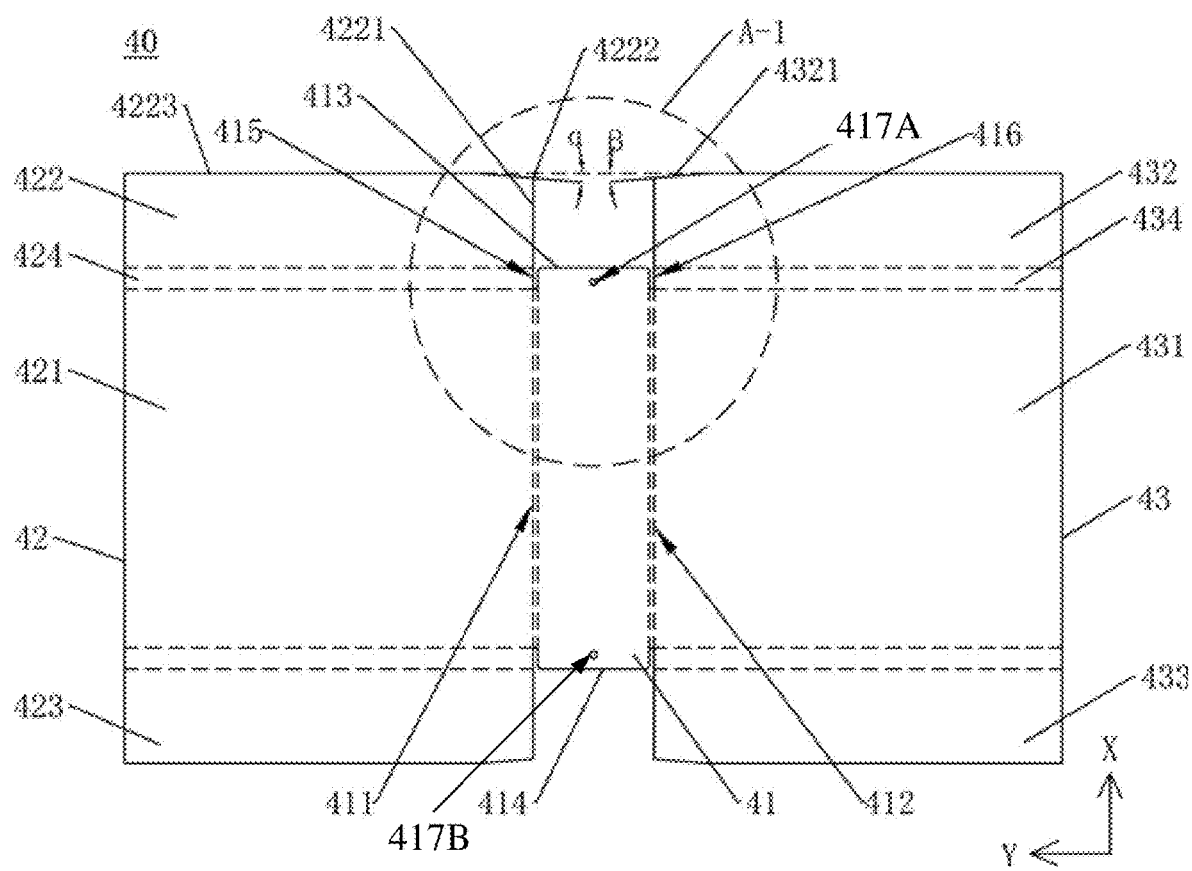
FIG. 5 is a schematic view of an appearance of an insulation film before being folded provided in an embodiment.

In an embodiment, reference is made to FIG. 4 and FIG. 5, the energy storage device 100 further includes an insulation film 40. The insulation film 40 is used to wrap the battery cell 301. That is, the insulation film 40 and the electrode assembly 30 are accommodated together in the housing 20. The insulation film 40 can wrap the bottom surface, the first broad surface, the second broad surface, the first side surface, and the second side surface of the battery cell 301. The top surface of the battery cell 301 is sealed by the end cap assembly 10.

Specifically, material of the insulation film 40 may be a high polymer. The insulation film 40 can wrap around the outer periphery of the battery cell 301 after being cut and folded. In this way, the battery cell 301 can be isolated from the housing 20 a battery case, and the battery cell 301 can be prevented from being scratched when the battery cell 301 is put into the housing 20. Further, a safety accident due to a direct contact between the battery cell 301 and the metal housing 20 may be prevented, thereby protecting the battery cell 301.

Reference is made to FIG. 5, the insulation film 40 is a sheet of intact flat film before wrapping the battery cell 301, and the insulation film 40 may be of a relatively three-dimensional structure after being folded. Therefore, the insulation film 40 before being folded and the insulation film 40 after being folded will be described when the insulation film 40 is described in the following.

Reference is made to FIG. 4 and FIG. 5, the insulation film 40 includes a bottom film 41, a first side film 42, and a second side film 43. The bottom film 41 is located at the bottom of the housing 20 after the insulation film 40 is folded, and the bottom film 41 is opposite to the end cap assembly 10. The bottom film 41 has a length direction X, a width direction Y, and a thickness direction Z (height direction). The length direction X of the bottom film 41 is a length direction X of the energy storage device 100, the width direction Y of the bottom film 41 is a width direction Y of the energy storage device 100, and the thickness direction Z of the bottom film 41 is a height direction of the energy storage device 100. The insulation film 40 is flat before being folded, and the bottom film 41, the first side film 42, and the second side film 43 are in the same plane. That is, the bottom film 41, the first side film 42, and the second side film 43 have the same length direction X, the same width direction Y, and the same thickness direction Z.

The bottom film 41, the first side film 42, and the second side film 43 are integrally formed. After the insulation film 40 is folded, the bottom film 41 is used to cover the bottom of the battery cell 301; the first side film 42 is used to cover the first broad surface, a portion of the first side surface, and a portion of the second side surface; and the second side film 43 is used to cover the second broad surface, the other portion of the first side surface, and the other portion of the second side surface.

Reference is made to FIG. 5, the bottom film 41 further includes a first side 411, a second side 412, and a third side 413. The first side 411 and the second side 412 are disposed opposite to each other in the width direction Y of the bottom film 41, and the third side 413 is connected to the first side 411 and the second side 412. The bottom film 41 also includes a fourth side 414 opposite to the third side 413. Therefore, the bottom film 41 is of a quadrilateral structure. In an embodiment, the first side 411 and the second side 412 have the same length, and the third side 413 and the fourth side 414 have the same length.

Reference is made to FIG. 5, the first side film 42 is connected to the first side 411, and the first side film 42 includes a first wrapping section 421 and a second wrapping section 422 connected to each other in the length direction X of the bottom film 41. The first wrapping section 421 is connected to the first side 411, and the second wrapping section 422 exceeds the third side 413. It may be explained that the insulation film 40 is of an integrally formed structure, and therefore the first side 411 is not really an edge of the insulation film 40, but rather may be understood as a crease formed by bending the bottom film 41 relative to the first side film 42.

Optionally, the electrode assembly 30 is of a race-track shape, and two ends of the electrode assembly 30 in the length direction are roughly semicircular. The housing 20 of the energy storage device 100 is rectangular. When the electrode assembly 30 is put into the housing 20, there is a gap between each of four top corners of the electrode assembly 30 and the housing 20, which provides a certain degree of freedom for the first wrapping section 421 and the second wrapping section 422 when the two ends of the electrode assembly 30 are wrapped by the insulation film 40.

In this way, the insulation film 40 and outer peripheral walls of the electrode assembly 30 may be fitted more closely, or a gap may exist between the insulation film 40 and outer peripheral walls of the electrode assembly 30, which leaves space for the breathing-like expansion deformation of the electrode assembly 30 in the process of charging and discharging of the energy storage device 100.

Optionally, reference is made to FIG. 5, the first side film 42 further includes a fifth wrapping section 423. The fifth wrapping section 423 is connected to a side of the first wrapping section 421 facing away from the second wrapping section 422, and the fifth wrapping section 423 exceeds the fourth side 414.

Reference is made to FIG. 5, the second side film 43 is connected to the second side 412, and the first side film 42 includes a third wrapping section 431 and a fourth wrapping section 432 connected to each other in the length direction X of the bottom film 41. The third wrapping section 431 is connected to the second side 412, and the fourth wrapping section 432 exceeds the third side 413. The case is the same for the second side 412 and the first side 411.

Optionally, reference is made to FIG. 5, the second side film 43 further includes a sixth wrapping section 433. The sixth wrapping section 433 is connected to a side of the third wrapping section 431 facing away from the fourth wrapping section 432, and the sixth wrapping section 433 exceeds the fourth side 414.

Reference is made to FIG. 4 and FIG. 5, when the battery cell 301 is wrapped by the insulation film 40, the first side film 42 is folded relative to the bottom film 41 along the first side 411, the second side film 43 is folded relative to the bottom film 41 along the second side 412, the second wrapping section 422 is folded relative to the first wrapping section 421, the fourth wrapping section 432 is folded relative to the third wrapping section 431, and the second wrapping section 422 and the fourth wrapping section 432 are connected and at least partially overlapped. The second wrapping section 422 and the fourth wrapping section 432 cooperatively wrap the first side surface of the battery cell 301.

It may be noted that, the fifth wrapping section 423 and the second wrapping section 422 are mirror-symmetric, and the sixth wrapping section 433 and the fourth wrapping section 432 are also mirror-symmetric. The fifth wrapping section 423 is folded relative to the first wrapping section 421, the sixth wrapping section 433 is folded relative to the third wrapping section 431, and the fifth wrapping section 423 and the sixth wrapping section 433 are connected and at least partially overlapped. The fifth wrapping section 423 and the sixth wrapping section 433 cooperatively wrap the second side surface of the battery cell 301. Therefore, only the second wrapping section 422 and the fourth wrapping section 432 are taken as examples in the following, and the fifth wrapping section 423 and the sixth wrapping section 433 may refer to the second wrapping section 422 and the fourth wrapping section 432.

Reference is made to FIG. 5, the second wrapping section 422 has a first cutting edge 4222 facing away from the first wrapping section 421 and close to the fourth wrapping section 432, and the fourth wrapping section 432 has a second cutting edge 4321 facing away from the third wrapping section 431 and close to the second wrapping section 422. The first cutting edge 4222 is angled relative to the third side 413, and the second cutting edge 4321 is angled relative to the third side 413.

Optionally, the second wrapping section 422 includes a fifth side 4221, the first cutting edge 4222, and a sixth side 4223. The fifth side 4221 extends in a direction of the first side 411, the sixth side 4223 is parallel to the third side 413, and the sixth side 4223 is located at an end of the second wrapping section 422 away from the first wrapping section 421. Two opposite ends of the first cutting edge 4222 are respectively connected to the fifth side 4221 and the sixth side 4223. The first cutting edge 4222 is angled relative to the sixth side 4223.

It may be understood that, an end of the second wrapping section 422 close to the fourth wrapping section 432 may be a right angle, and the fifth side 4221 and the sixth side 4223 may be directly connected. Then, after a cutting process, the first cutting edge 4222 is formed, and thus an angle is formed. Likewise, the second cutting edge 4321 is formed in the same way, which will not be repeated herein.

In the disclosure, the bottom film 41, the first side film 42, and the second side film 43 of the insulation film 40 are integrally formed, which allows the whole insulation film 40 to be manufactured as an integrally formed structure by means of hot-pressing, casting, etc. Then a portion of the first side film 42 exceeding the bottom film 41 and a portion of the second side film 43 exceeding the bottom film 41 can be manufactured by means of super speed cutting. That the insulation film 40 is of an integrally formed structure not only reduces excessive materials during the preparation of the insulation film 40, but also enables multiple insulation films 40 to be integrally formed and divided into multiple insulation films 40 by cutting continuously, thereby improving the manufacturing efficiency of the insulation film 40. In addition, the battery cell 301 is wrapped by the whole insulation film 40, which is convenient for operators to perform the positioning during the assembly.

Further, in the disclosure, the second wrapping section 422 has the first cutting edge 4222 and the fourth wrapping section 432 has the second cutting edge 4321, so that the second wrapping section 422 and the fourth wrapping section 432 may be prevented from squeezing each other after being folded, and thus a jamming may be prevented, and a process of manual smoothing may be reduced. Further, during the process of wrapping the insulation film 40, the first cutting edge 4222 and the second cutting edge 4321 can guide the repositioning of a mismatching portion of the second wrapping section 422 and a mismatching portion of the fourth wrapping section 432. In this way, operators may wrap the insulation film 40 more conveniently.

In an embodiment, reference is made to FIG. 5, the first cutting edge 4222 and the third side 413 define an angle α, and the second cutting edge 4321 and the third side 413 define an angle β, where $1°≤α≤8°$, and $1°≤β≤8°$.

Specifically, the angle α and the angle β may be the same, and the angle α and the angle β each may be but are not limited to 1°, 2°, 3°, 4°, 5°, 6°, 7°, 8°. In an embodiment, the angle α and the angle β are both 5°.

By setting the angle defined by the first cutting edge 4222 and the third side 413 and the angle defined by the second cutting edge 4321 and the third side 413 within the above range, the mismatching portion of the second wrapping section 422 and the mismatching portion of the fourth wrapping section 432 may be guided to be repositioned during the process of wrapping the insulation film 40, so that operators may wrap the insulation film 40 more conveniently. By setting the angles within the above range, a problem of exposing the battery cell 301 caused by over cutting the insulation film 40 may be prevented.

Figure 6:
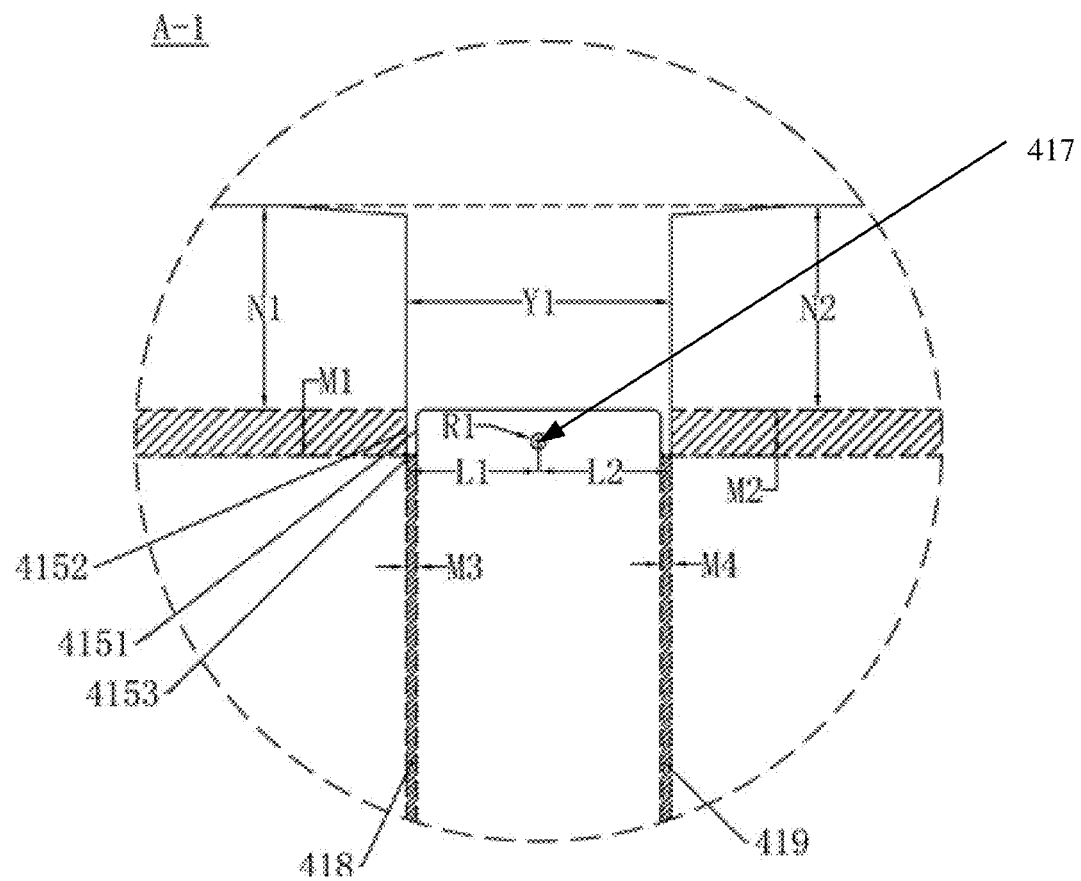
FIG. 6 is a schematic enlarged view of portion A-1 of FIG. 5.

In an embodiment, reference is made to FIG. 5 and FIG. 6, a first groove 415 and a second groove 416 are defined on the third side 413, the first groove 415 extends along the first side 411, and the second groove 416 extends along the second side 412. The first groove 415 is defined between the bottom film 41 and the first side film 42, and the second groove 416 is defined between the bottom film 41 and the second side film 43. A bottom wall of the first groove 415 and a bottom wall of the second groove 416 each have an arc-shaped contour.

Specifically, the first groove 415 and the second groove 416 may be defined by cutting the third side 413, and both the first groove 415 and the second groove 416 extend in the length direction X of the bottom film 41. Moreover, the first groove 415 extends from the first side 411 in the length direction X, and the second groove 416 extends from the second side 412 in the length direction X.

Optionally, the bottom wall of the first groove 415 and the bottom wall of the second groove 416 each have an arc-shaped contour. Taking the first groove 415 as an example, the first groove 415 has a first inner side 4151 and a second inner side 4152 in the width direction Y of the bottom film 41. The first inner side 4151 is connected to the second inner side 4152 through a first inner curved side 4153, and the first inner curved side 4153 is arc-shaped. Therefore, the second groove 416 can also be of the same structure, which includes a third inner side, a fourth inner side, and a second inner curved side.

Optionally, a contour line of the first inner side 4151 can coincide with a contour line of the first side 411, and a contour line of the third inner side can coincide with a contour line of the second side 412.

Optionally, a third groove and a fourth groove are defined on the fourth side 414. The third groove is opposite to the first groove 415 in the length direction X, and the fourth groove is opposite to the second groove 416 in the length direction X, which will not be repeated herein.

Optionally, the first groove 415, the second groove 416, the third groove, and the fourth groove all have the same groove depth. The first groove 415, the second groove 416, the third groove, and the fourth groove all have the same groove width.

By defining the first groove 415 and the second groove 416 on the third side 413, a sharp bending angle may not be formed at a bending position when each of the first side film 42 and the second side film 43 is folded, and thus a tearing of the insulation film 40 at the bending position may be avoided. Further, since the bottom wall of the first groove 415 and the bottom wall of the second groove 416 are arc-shaped, an occurrence of a sharp bending angle may be further reduced. In this way, an accidental tearing of the insulation film 40 during the process of wrapping by operators may be avoided, thereby improving the product yield and the working efficiency, and reducing the manufacturing cost of the energy storage device 100.

In an embodiment, reference is made to FIG. 6, the first side 411 is connected to the third side 413 in an arc connection manner, and the second side 412 is connected to the third side 413 in an arc connection manner. Specifically, when the first groove 415 and the second groove 416 are defined on the third side 413, the third side 413 and the second inner side 4152 of the above embodiment can define an angle, the third side 413 and the fourth inner side of the above embodiment can define an angle, and the angles can be 90°.

Therefore, the third side 413 is connected to the second inner side 4152 in an arc connection manner, and the third side 413 is connected to the fourth inner side in an arc connection manner. Likewise, the fourth side 414 is formed in the same way, which will not be repeated herein.

Since the first side 411 is connected to the third side 413 in an arc connection manner and the second side 412 is connected to the third side 413 in an arc connection manner, the first side 411 does not have a sharp corner after the first groove 415 and the second groove 416 are defined. In this way, an occurrence of a sharp bending angle may be further reduced, and thus an accidental tearing of the insulation film 40 during the process of wrapping by operators may be avoided, thereby improving the product yield and the working efficiency, and reducing the manufacturing cost of the energy storage device 100.

In an embodiment, reference is made to FIG. 2, FIG. 5, and FIG. 6, the energy storage device 100 further includes a bottom support plate 50. The bottom film 41 defines a positioning hole 417 penetrating the bottom film 41, and the positioning hole 417 is configured to position and install the bottom support plate 50. The positioning hole 417 is a circular hole, and the positioning hole 417 satisfies: $0.9 \leq (L1-R1)/(L2-R1) \leq 1.1$, where R1 is a radius of the positioning hole 417, and in the width direction of the bottom film 41, L1 is a distance from a center of the positioning hole 417 to the first side 411 and L2 is a distance from the center of the positioning hole 417 to the second side 412.

Specifically, the bottom film 41 defines the positioning hole 417 in the thickness direction Z, and the positioning hole 417 may include a first positioning hole 417A and a second positioning hole 417B. The first positioning hole 417A is located at an end of the bottom film 41 close to the third side 413 in the length direction X of the bottom film 41, and the second positioning hole 417B is located at an end of the bottom film 41 close to the fourth side 414 in the length direction X of the bottom film 41. As there are two battery cells 301, the positioning hole 417 is used for the positioning of the battery cells 301 when the battery cells 301 are wrapped by the insulation film 40.

Optionally, the positioning hole 417 is a circular hole, and $(L1-R1)/(L2-R1)$ may be but is not limited to 0.9, 0.92, 0.94, 0.96, 0.98, 1, 1.02, 1.04, 1.06, 1.08, or 1.1. The value less than or greater than the above range indicates that a distance from the positioning hole 417 to the first side 411 or a distance from the positioning hole 417 to the second side 412 is too small, which is not conducive to the positioning and the assembly between the battery cell 301 and the insulation film 40.

By setting the distance from the positioning hole 417 to the first side 411 and the distance from the positioning hole 417 to the second side 412 to satisfy the above relation, it can be ensured that there is no installation deviation during the assembly of the insulation film 40 and the battery cell 301. In this way, errors may be further reduced during the assembly.

In an embodiment, reference is made to FIG. 6, in the length direction X of the bottom film 41, the second wrapping section 422 exceeds the third side 413 by a length N1, and the fourth wrapping section 432 exceeds the third side 413 by a length N2, where $0.9 \leq N1/N2 \leq 1.1$ and $20 \text{ mm} \leq N1 \leq 40 \text{ mm}$.

Specifically, N1/N2 may be but is not limited to 0.9, 0.92, 0.94, 0.96, 0.98, 1, 1.02, 1.04, 1.06, 1.08, or 1.1. N1 may be but is not limited to 20 mm, 25 mm, 30 mm, 35 mm, or 40 mm.

The second wrapping section 422 and the fourth wrapping section 432 may be similar in size if N1/N2 satisfies the above range. The length N1 of part of the second wrapping section 422 exceeding the third side is within the above range, so that the second wrapping section 422 and the fourth wrapping section 432 may be partially overlapped after the insulation film 40 is folded. Moreover, since the second wrapping section 422 and the fourth wrapping section 432 are similar in size, the battery cell 301 may be prevented from being wrapped incompletely.

In an embodiment, reference is made to FIG. 6, in the width direction Y of the bottom film 41, a length Y1 of the third side 413 satisfies: $1.25 \leq (N1+N2)/Y1 \leq 1.75$. Specifically, the length of the third side 413 is actually the width of the battery cell 301. The above relation being satisfied can ensure that the second wrapping section 422 and the fourth wrapping section 432 are able to completely wrap the battery cell 301, and can also ensure that the second wrapping section 422 and the fourth wrapping section 432 are not too long. In this way, the wrapping sections may be prevented from curling up caused by the excess insulation film.

Specifically, $(N1+N2)/Y1$ may be but is not limited to 1.25, 1.3, 1.35, 1.4, 1.45, 1.5, 1.55, 1.6, 1.65, 1.7, or 1.75.

The value of $(N1+N2)/Y1$ less than the range of the above relation indicates that a portion where the second wrapping section 422 and the fourth wrapping section 432 are overlapped is too small, which makes the second wrapping section 422 and the fourth wrapping section 432 prone to be scraped by the housing 20 when the housing 20 is assembled. In this case, a portion of the battery cell 301 may not be wrapped by the insulation film 40, and thus the battery cell 301 may be in a direct contact with the housing 20. The value of $(N1+N2)/Y1$ greater than the range of the above relation indicates that a portion where the second wrapping section 422 and the fourth wrapping section 432 are overlapped is too much and the overlapping portion is greater than the width of the side of the battery cell 301, which makes a portion of the second wrapping section 422 and a portion of the fourth wrapping section 432 wind and cover the first broad surface and the second broad surface. In this case, the majority of the outer side of the battery cell 301 may be wrapped by two layers of the insulation film 40, and thus the insulation film 40 may be scraped by the housing 20 when the housing 20 is assembled, which makes the insulation film 40 more prone to wrinkling and stacking together.

In an embodiment, reference is made to FIG. 5 and FIG. 6, the first side film 42 further includes a first bending section 424 defined by the first groove 415, and the second side film 43 further include a second bending section 434 defined be the second groove 416. In the length direction X of the bottom film 41, two opposite sides of the first bending section 424 are respectively connected to the first wrapping section 421 and the second wrapping section 422, and two opposite sides of the second bending section 434 are respectively connected to the third wrapping section 431 and the fourth wrapping section 432. In the length direction X of the bottom film 41, the first bending section 424 has a length M1, the second bending section 434 has a length M2, where $0.9 \leq M1/M2 \leq 1.1$, and $1.75 \text{ mm} \leq M1 \leq 10.35 \text{ mm}$. When the battery cell 301 is wrapped by the insulation film 40, the first bending section 424 and the second bending section 434 are bent and deformed to make the second wrapping section 422 folded relative to the first wrapping section 421 and the fourth wrapping section 432 folded relative to the third wrapping section 431.

Specifically, the first bending section 424 is a dashed portion between the first wrapping section 421 and the second wrapping section 422 as illustrated in FIG. 5, and the first bending section 424 and the second wrapping section 422 are divided by a dashed line on top in FIG. 5. Therefore, an extension line of the dashed line on top in FIG. 5 can be parallel to and coincide with the third side 413. The second bending section 434 and the first bending section 424 are arranged in the same way.

Optionally, the length M1 of the first bending section 424 is equal to the groove depth of the first groove 415, and the length M2 of the second bending section 434 is equal to the groove depth of the second groove 416.

Optionally, M1/M2 may be but is not limited to 0.9, 0.92, 0.94, 0.96, 0.98, 1, 1.02, 1.04, 1.06, 1.08, or 1.1. M1 may be but is not limited to 1.75 mm, 2 mm, 3.25 mm, 4.25 mm, 5.25 mm, 6.25 mm, 7.25 mm, 8.25 mm, 9.25 mm, or 10.35 mm.

In an embodiment, 2 mm≤M1≤6.25 mm, which further limits the length M1 of the first bending section 424. In this way, the size of the insulation film 40 may be reduced while ensuring a degree of freedom for bending, and materials and the manufacturing cost may be saved while achieving the same effect.

With the first bending section 424 defined by the first groove 415, and the second bending section 434 defined by the second groove 416, a degree of freedom for bending is provided for the wrapping sections when the wrapping sections are folded, and thus a sharp bending angle and a bending interference may be avoided. The first bending section 424 with a length within the above range is disposed between the first wrapping section 421 and the second wrapping section 422, so that the second wrapping section 422 can have a certain degree of freedom for bending when the second wrapping section 422 is bent relative to the first wrapping section 421. In this way, precision requirements for bending can be reduced. Further, by limiting the first bending section 424 and the second bending section 434 to satisfy the above relation, the first bending section 424 and the second bending section 434 may be similar in size, which not only leaves a range of allowable error in cutting the insulation film 40, but also ensures that the first bending section 424 and the second bending section 434 are not too short. In this way, the battery cell 301 may be prevented from being wrapped incompletely by the second wrapping section 422 or the fourth wrapping section 432.

In an embodiment, reference is made to FIG. 5 and FIG. 6, in the width direction Y of the bottom film 41, the bottom film 41 further includes a third bending section 418 and a fourth bending section 419. The first side 411 is located at the third bending section 418, and the second side 412 is located at the fourth bending section 419. In the width direction Y of the bottom film 41, the third bending section 418 has a width M3, and the fourth bending section 419 has a width M4, where 0.9≤M3/M4≤1.1, 1 mm≤M3≤2.55 mm.

Specifically, the third bending section 418 is a dashed portion on the bottom film 41 as illustrated FIG. 6, and the dashed line on the left in the drawing is the first side 411. Therefore, an extension line of the dashed line on the left in the drawing can be parallel to and coincide with a second inner side 4152. The fourth bending section 419 and the third bending section 418 are arranged in the same way.

Optionally, the length M3 of the third bending section 418 is equal to the groove depth of the first groove 415, and the length M4 of the fourth bending section 419 is equal to the groove depth of the second groove 416.

Optionally, M3/M4 may be but is not limited to 0.9, 0.92, 0.94, 0.96, 0.98, 1, 1.02, 1.04, 1.06, 1.08, or 1.1. M3 may be but is not limited to 1 mm, 1.5 mm, 2 mm, or 2.5 mm.

The third bending section 418 with a length within the above range is disposed on the bottom film 41, so that the first side film 42 can have a certain degree of freedom for bending when the first side film 42 is bent relative to the bottom film 41. In this way, precision requirements for bending can be reduced. Further, by limiting the third bending section 418 and the fourth bending section 419 to satisfy the above relation, the third bending section 418 and the fourth bending section 419 may be similar in size, which not only leaves a range of allowable error in cutting the insulation film 40, but also ensures that the third bending section 418 and the fourth bending section 419 are not too short. In this way, the battery cell 301 may be prevented from being wrapped incompletely by the first side film 42 or the second side film 43.

Figure 7:
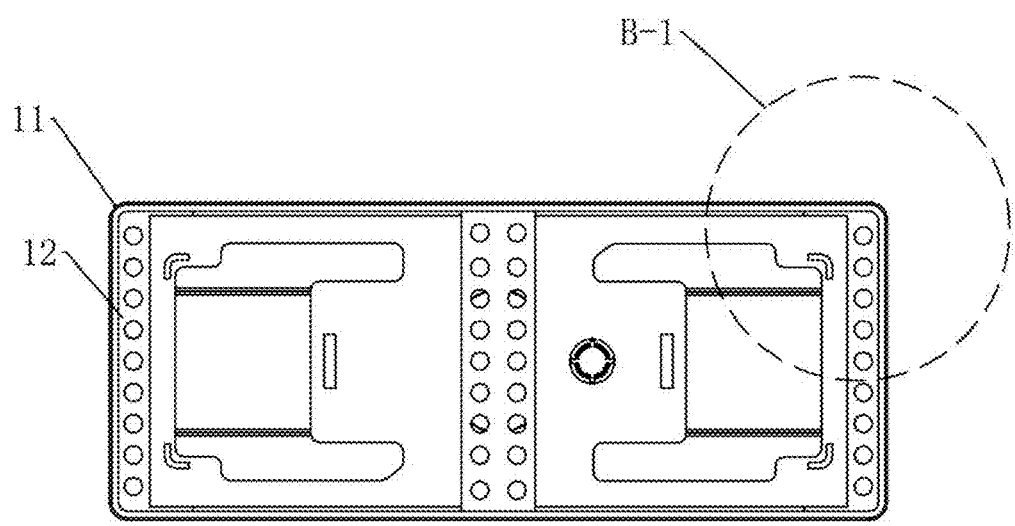
FIG. 7 is a top view of the end cap assembly provided in an embodiment.
Figure 8:
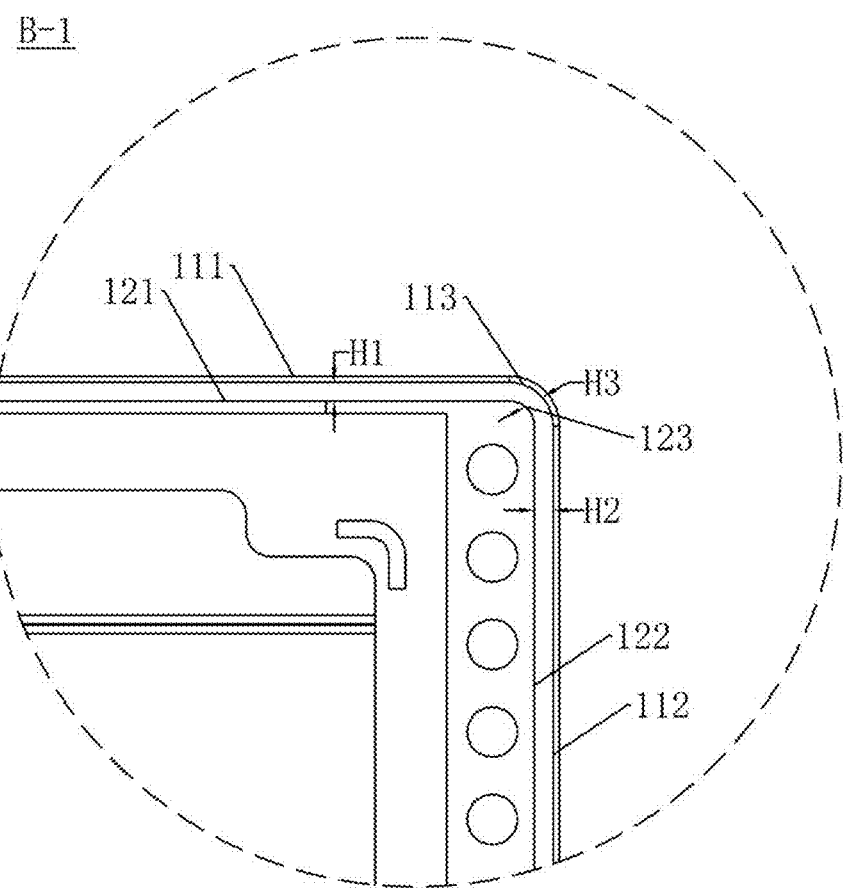
FIG. 8 is a schematic enlarged view of portion B-1 of FIG. 7.

In an embodiment, reference is made to FIG. 7 and FIG. 8, the cover plate 11 may be quadrilateral. The cover plate 11 includes a first outer side surface 111 and a second outer side surface 112 that are connected at an angle. The first outer side surface 111 is a surface perpendicular to a width direction Y of the cover plate 11, and the second outer side surface 112 is a surface perpendicular to a length direction X of the cover plate 11. The cover plate 11 may quadrilateral, and the cover plate 11 may have two first outer side surfaces 111 located at two opposite sides in the width direction Y of the cover plate 11. The cover plate 11 may have two second outer side surfaces 112 located at two opposite sides in the length direction X of the cover plate 11. The following is a description with one first outer side surface 111 and one second outer side surface 112 as an example, which serves as a reference for other situations.

Further, the lower plastic 12 includes a third outer side surface 121 facing the same direction as the first outer side surface 111, and a fourth outer side surface 122 facing the same direction as the second outer side surface 112. The third outer side surface 121 is connected to the fourth outer side surface 122, the first outer side surface 111 exceeds the third outer side surface 121, and the second outer side surface 112 exceeds the fourth outer side surface 122. The first wrapping section 421 or the third wrapping section 431 is connected to the third outer side surface 121, and the second wrapping section 422 and the fourth wrapping section 432 are connected to the fourth outer side surface 122. The second wrapping section 422 and the fourth wrapping section 432 are connected and at least partially overlapped.

It may be understood that, the contour of the lower plastic 12 and the contour of the cover plate 11 are of the same shape, and an orthographic projection of the lower plastic 12 on the cover plate 11 is smaller than the cover plate 11. Therefore, after the opening of the housing 20 is sealed by the cover plate 11, the lower plastic 12 can be accommodated inside the housing 20.

A specific assembly method of the energy storage device 100 is in the following. The insulation film 40 is folded and wraps the battery cell 301, and a portion of the insulation film 40 exceeding the top surface of the battery cell 301 is welded with the lower plastic 12, so that the battery cell 301 may be hung below the end cap assembly 10 by the insulation film 40. A welding point where the insulation film 40 and the lower plastic 12 are welded is a stress point. Then the battery cell 301 wrapped by the insulation film 40 is put into the housing 20.

Figure 11:
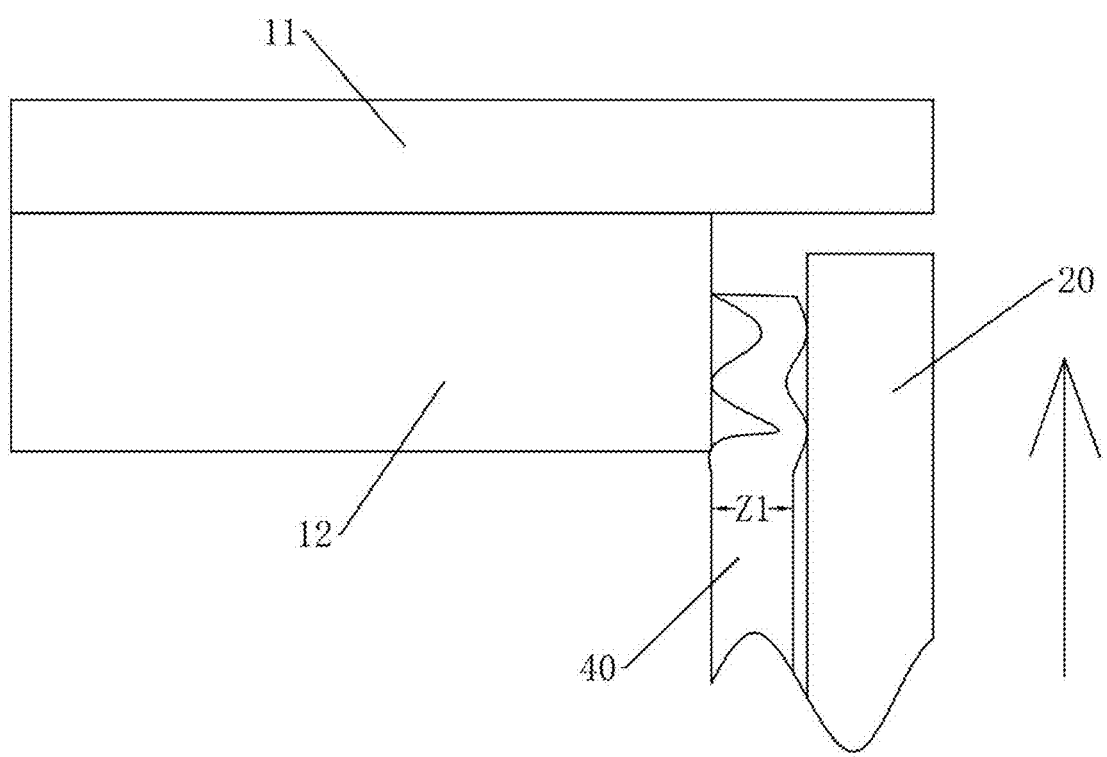
FIG. 11 is a schematic diagram of an insulation film being wrinkled during installation of a housing in an embodiment.

In order to enhance the energy density of the energy storage device 100, a gap between the battery cell 301 and the housing 20 is usually small (with a group margin of 85% or above, and the group margin is a volume ratio of the battery cell 301 to the housing 20). The gap is also used to accommodate the insulation film 40. There is a great frictional force between the insulation film 40 and the inner wall of the housing 20. Therefore, as illustrated in FIG. 11, during the upward movement of the housing 20, the insulation film 40 is extruded by the inner wall of the housing 20 to form a wrinkle, and as the housing 20 continues to move upward, the wrinkle will also be moved upward and ultimately stacked at the welding point where the insulation film 40 and the lower plastic 12 are welded. In this case, the insulation film 40 at the welding point is subject to a relatively large force, which makes the welding point prone to cracking, thereby causing the insulation film 40 to be detached from the lower plastic 12.

In the width direction Y of the cover plate 11, a distance between the first outer side surface 111 and the third outer side surface 121 is H1. In a length direction X of the cover plate 11, a distance between the second outer side surface 112 and the fourth outer side surface 122 is H2. The cover plate 11 and the lower plastic 12 satisfy: $1 < H2/H1 \leq 1.25$.

Optionally, H2/H1 may be but is not limited to 1.02, 1.05, 1.07, 1.1, 1.12, 1.15, 1.17, 1.2, 1.22, or 1.25.

The first outer side surface 111 and the third outer side surface 121 are spaced apart, and the second outer side surface 112 and the fourth outer side surface 122 are spaced apart, so that a certain amount of accommodating space is provided for wrinkles of the insulation film 40 that appear after the insulation film 40 is welded, and wrinkles of the insulation film 40 may be prevented from scratching the housing 20, thereby avoiding a cracking at the welding point. In this way, the risk of the insulation film 40 detaching from the side of the lower plastic 12 may be lowered, and the energy density of the energy storage device 100 may be improved. Moreover, setting the distance H1 and the distance H2 within the above range can ensure that a larger accommodating space is provided for the two-layer film structure formed by the overlap of the second wrapping section 422 and the fourth wrapping section 432, thereby reducing the risk of the insulation film 40 on the fourth outer side surface 122 detaching from the lower plastic 12.

In an embodiment, reference is made to FIG. 7 and FIG. 8, the cover plate 11 further includes a first curved surface 113, and the lower plastic 12 further includes a second curved surface 123. Two ends of the first curved surface 113 are respectively connected to the first outer side surface 111 and the second outer side surface 112, and two ends of the second curved surface 123 are respectively connected to the third outer side surface 121 and the fourth outer side surface 122. The first curved surface 113 exceeds the second curved surface 123, a distance between the first curved surface 113 and the second curved surface 123 is H3, and the cover plate 11 and the lower plastic 12 satisfy: $1.15 < H3/H1 \leq 1.85$.

Optionally, the first curved surface 113 and the second curved surface 123 may be regular curved surfaces, or may be transitional curved surfaces. The second curved surface 123 is bent inward relative to a plane direction defined by the first curved surface 113 in the length direction X and the width direction Y, and a distance between a middle position of the second curved surface 123 and a middle position of the first curved surface 113 (i.e., the positions of the four top corners of the cover plate 11) is H3.

Specifically, the first curved surface 113 can be a transitional curved surface of the cover plate 11 formed in the process of manufacturing. The second curved surface 123 can be a transitional curved surface of the lower plastic 12 formed in the process of manufacturing. Moreover, it may be understood that when an orthographic projection of plastic 12 on the cover plate 11 is smaller than the area of the cover plate 11, a gap will inevitably exist between the first curved surface 113 and the second curved surface 123. The distance H3 depends on the difference in curvature radius between the two curved surfaces.

Optionally, H3/H1 may be but is not limited to 1.15, 1.25, 1.35, 1.45, 1.55, 1.65, 1.75, or 1.85.

The second curved surface 123 is taken as an example in the following (the other three curved surfaces are similar to the second curved surface 123). The lower plastic 12 has the second curved surface 123, so that the second curved surface 123 can be used to abut against and guide the first bending section 424 of the insulation film 40 in the above embodiment. That is, the first bending section 424 may be folded along the second curved surface 123, and then the first bending section 424 is welded and fixed to the fourth outer side surface 122. In this case, the first bending section 424 serves as a transitional section between the first wrapping section 421 and the second wrapping section 422, which makes the first bending section 424 fit more tightly to the outer walls of two ends of the electrode assembly 30 in the length direction (the second bending section 434 is similar to the first bending section 424, which will not be repeated herein). Alternatively, when the first wrapping section 421 and the second wrapping section 422 of the insulation film 40 wrap the battery cell 301, the second wrapping section 422 is folded 90° relative to the first wrapping section 421 with the second curved surface 123 as a guiding surface, and the second wrapping section 422 is welded to the fourth outer side surface 122 in a relatively loose manner. In this case, the second curved surface 123 does not abut against the first bending section 424. Instead, a gap exists between the second curved surface 123 and the first bending section 424. The first bending section 424 not abutting against the second curved surface 123 or a gap between the second curved surface 123 and the first bending section 424 can provide a certain degree of freedom for bending for the first wrapping section 421 and the second wrapping section 422. Further, by setting the parameter of the second curved surface 123 within the above range, the bending position of the insulation film 40 may be prevented from bulging caused by the bending position being too far away from a jelly roll, thereby avoiding a situation where the electrode assembly 30 wrapped by the insulation film 40 is unable to be accommodated in the housing 20 due to interference between the insulation film 40 and the inner wall of the housing 20. A gap between the second curved surface 123 and the first bending section 424 can leave space for the breathing-like expansion deformation of the electrode assembly 30 in the process of charging and discharging of the energy storage device 100. In this way, the electrode assembly 30 will not be wrapped tightly by the insulation film 40, the electrode assembly 30 will not expand to break the insulation film 40 during the charging and discharging process of the energy storage device 100, and the insulation film 40 will not be detached from the welding point in the side wall of the lower plastic 12. Therefore, the reliability of the welding is ensured and the safety performance of the energy storage device 100 is improved.

Optionally, the actual size of H1 may be 1.4 mm, 1.45 mm, 1.5 mm, 1.55 mm, 1.6 mm, 1.65 mm, or 1.7 mm.

Optionally, the actual size of H2 may be 1.6 mm, 1.65 mm, 1.75 mm, 1.8 mm, 1.85 mm, 1.9 mm, or 1.95 mm.

Optionally, the actual size of H3 may be 2.2 mm, 2.25 mm, 2.3 mm, 2.35 mm, 2.4 mm, 2.45 mm, 2.5 mm, 2.55 mm, or 2.6 mm.

In an embodiment, reference is made to FIG. 8 and FIG. 11, a thickness Z1 of the insulation film 40, the distance H1, and the distance H2 satisfy: $1 < (H2-Z1)/(H1-Z1) \leq 1.2$.

Specifically, on the basis of the above embodiment, the insulation film 40 will wrinkle due to frictional force, and the thickness of wrinkles will take up the space of the distance H1 and the distance H2. Therefore, the thickness of the insulation film 40 may be controlled in a suitable range in order to ensure that the thickness of the insulation film 40 will not take up too much space of the distance H1 and the distance H2.

Optionally, (H2−Z1)/(H1−Z1) may be but is not limited to 1, 1.02, 1.05, 1.07, 1.1, 1.12, 1.15, 1.17, or 1.2.

Figure 9:
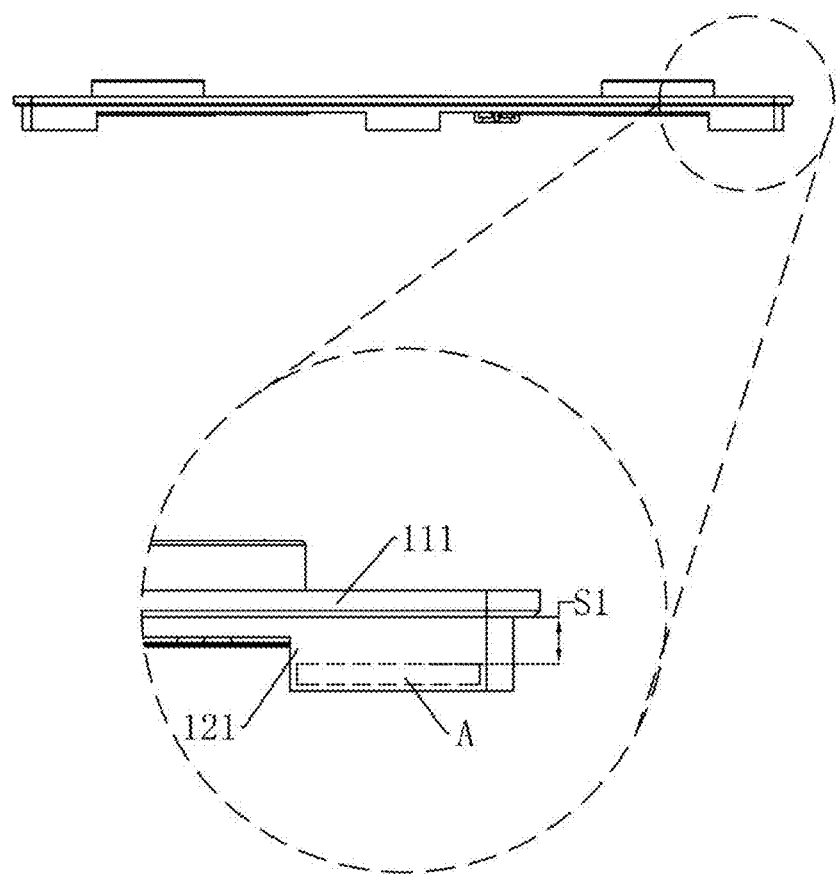
FIG. 9 is a front view of the end cap assembly provided in an embodiment.
Figure 10:
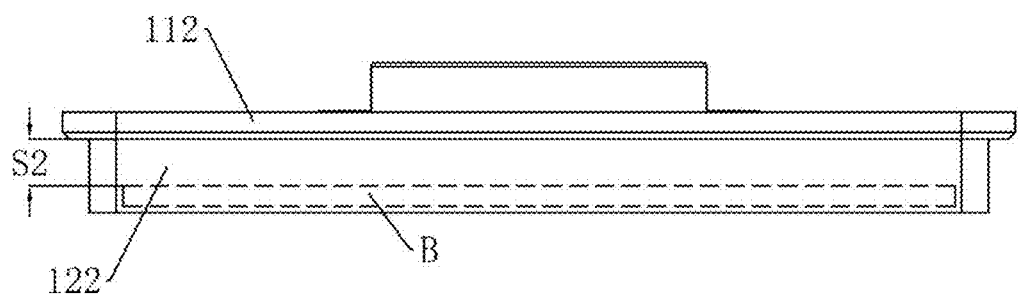
FIG. 10 is a side view of the end cap assembly provided in an embodiment.

In an embodiment, reference is made to FIG. 9 and FIG. 10, the third outer side surface 121 has a first bonding region A, the fourth outer side surface 122 has a second bonding region B, and the insulation film 40 is connected to the first bonding region A and the second bonding region B. In a thickness direction Z of the lower plastic 12, the first bonding region A is located at an end of the third outer side surface 121 away from the cover plate 11, the second bonding region B is located at an end of the fourth outer side surface 122 away from the cover plate 11. An edge of the first bonding region A is spaced apart from the cover plate 11 by a distance S1, and an edge of the second bonding region B is spaced apart from the cover plate 11 by a distance S2, where 0.9≤S1/S2≤1.1, and 1.55 mm≤S1≤2.85 mm.

Specifically, the first bonding region A is the welding point where the insulation film 40 and the lower plastic 12 are welded in the above embodiment. It may be understood that, there is no actual first bonding region A on the lower plastic 12, and the area of the first bonding region A is the maximum area of the welding point. It may be noted that, the distance S/between the edge of the first bonding region A and the cover plate 11 may be understood as the closest distance between the welding point and the cover plate 11 (in the thickness direction Z).

On the basis of the above embodiments, since the insulation film 40 will wrinkle, the welding point being too close to the cover plate 11 will cause wrinkles to be too close to the cover plate 11. In this case, wrinkles of the insulation film 40 may be partially clamped by the housing 20 and the cover plate 11 after the housing 20 is connected to the cover plate 11. Therefore, a gap will appear between the housing 20 and the cover plate 11, which will lead to air leakage inside the housing.

Optionally, S1 may be but is not limited to 1.55 mm, 1.75 mm, 1.95 mm, 2 mm, 2.25 mm, 2.45 mm, 2.65 mm, or 2.85 mm. When S1 is in the above range, the first bonding region A maintains a distance from the cover plate 11. Even if the insulation film 40 wrinkles, the position of wrinkles is still below the lower plastic 12, and wrinkles can still maintain a distance from the cover plate 11. Therefore, wrinkles will not be clamped between the housing 20 and the cover plate 11.

S1 that is less than the above range indicates that the first bonding region A is too close to the cover plate 11, which makes it easy for wrinkles to be clamped between the housing 20 and the cover plate 11. S1 that is greater than the above range indicates that the first bonding region A is too far away from the cover plate 11, which means the area of the first bonding region A is too small. In this case, the welding point where the insulation film 40 and the lower plastic 12 are welded may be too small, resulting in that the welding is not reliable and the insulation film 40 is easy to be detached from the lower plastic 12.

Optionally, S1/S2 may be but is not limited to 0.9, 0.92, 0.94, 0.96, 0.98, 1, 1.02, 1.04, 1.06, 1.08, or 1.1. When S1/S2 is in the above range, the first bonding region A and the second bonding region B are at similar heights. In this way, the insulation film 40 after welding may support the battery cell 301 without being askew, thereby further avoiding uneven stress on the insulation film 40 and ensuring that the battery cell 301 will not come off from the support of the insulation film 40.

In description of embodiments of the disclosure, it may be understood that locations or positional relationships indicated by terms such as "center", "on", "under", "left", "right", "vertical", "horizontal", "in", "out", and the like are locations or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitations to the disclosure.

The above embodiments are only a part embodiments of this disclosure, of course, the above embodiments cannot be used to limit the scope of the disclosure, the ordinary skill in the field can understand all or a part of the process to realize the above embodiments of the disclosure, and the equivalent changes made in accordance with the claims of the disclosure, still belong to the scope of the disclosure covered.

What is claimed is:

1. An energy storage device, comprising an insulation film and an electrode assembly, wherein the electrode assembly is wrapped by the insulation film, and the insulation film comprises a bottom film, a first side film, and a second side film;
   the bottom film comprises a first side, a second side, and a third side, wherein the first side is opposite to the second side in a width direction of the bottom film, and the third side is connected to the first side and the second side;
   the first side film is connected to the first side, and the first side film comprises a first wrapping section and a second wrapping section connected to the first wrapping section in a length direction of the bottom film; and the first wrapping section is connected to the first side, and the second wrapping section exceeds the third side in the length direction of the bottom film;
   the second side film is connected to the second side, and the first side film comprises a third wrapping section and a fourth wrapping section connected to the third wrapping section in the length direction of the bottom film; and the third wrapping section is connected to the second side, and the fourth wrapping section exceeds the third side in the length direction of the bottom film;
   the bottom film, the first side film, and the second side film are integrally formed;
   when the electrode assembly is wrapped by the insulation film, the first side film is folded relative to the bottom film along the first side, the second side film is folded relative to the bottom film along the second side, the second wrapping section is folded relative to the first wrapping section, the fourth wrapping section is folded relative to the third wrapping section, and the second wrapping section and the fourth wrapping section are connected and at least partially overlapped;
   a first groove and a second groove are defined on the third side, the first groove extends along the first side, and the second groove extends along the second side; the first groove is defined between the bottom film and the first side film, and the second groove is defined between the bottom film and the second side film; and
   the first side film further comprises a first bending section defined by the first groove, and the second side film further comprises a second bending section defined by the second groove; in the length direction of the bottom film, two opposite sides of the first bending section are respectively connected to the first wrapping section and the second wrapping section, and two opposite sides of the second bending section are respectively connected to the third wrapping section and the fourth wrapping section; and when the electrode assembly is wrapped by the insulation film, the first bending section and the second bending section are bent and deformed, to make the second wrapping section folded relative to the first wrapping section and the fourth wrapping section folded relative to the third wrapping section;

the second wrapping section has a first cutting edge facing away from the first wrapping section and close to the fourth wrapping section, and the fourth wrapping section has a second cutting edge facing away from the third wrapping section and close to the second wrapping section; and the first cutting edge is angled relative to the third side, and the second cutting edge is angled relative to the third side;

the first cutting edge and the third side define an angle $\alpha$, and the second cutting edge and the third side define an angle $\beta$, wherein $1°\leq\alpha\leq8°$, and $1°\leq\beta\leq8°$;

in the length direction of the bottom film, the first bending section has a length M1, and the second bending section has a length M2, wherein 1.75 mm≤M1≤10.35 mm, and 0.9≤M1/M2≤1.1;

in the width direction of the bottom film, the bottom film further comprises a third bending section and a fourth bending section facing away from each other; the first side is located at the third bending section, the second side is located at the fourth bending section, and in the width direction of the bottom film, the third bending section has a width M3, and the fourth bending section has a width M4, wherein 1 mm≤M3≤2.55 mm, and 0.9≤M3/M4≤1.1;

the energy storage device further comprises a cover plate, a lower plastic, and a housing, wherein the cover plate comprises a first outer side surface and a second outer side surface that are connected at an angle; the lower plastic is connected to the cover plate, the lower plastic comprises a third outer side surface facing the same direction as the first outer side surface, and a fourth outer side surface facing the same direction as the second outer side surface; the third outer side surface is connected to the fourth outer side surface, the first outer side surface exceeds the third outer side surface, and the second outer side surface exceeds the fourth outer side surface;

the third outer side surface has a first bonding region, the fourth outer side surface has a second bonding region, and the insulation film is connected to the first bonding region and the second bonding region; in a thickness direction of the lower plastic, the first bonding region is located at an end of the third outer side surface away from the cover plate, the second bonding region is located at an end of the fourth outer side surface away from the cover plate; and an edge of the first bonding region is spaced apart from the cover plate by a distance S1, wherein 1.55 mm≤S1≤2.85 mm.

2. The energy storage device of claim 1, wherein a bottom wall of the first groove and a bottom wall of the second groove each have an arc-shaped contour.

3. The energy storage device of claim 1, wherein the first side is connected to the third side in an arc connection manner, and the second side is connected to the third side in an arc connection manner.

4. The energy storage device of claim 1, further comprising a bottom support plate, wherein the bottom film defines a positioning hole penetrating the bottom film, and the positioning hole is configured to position and install the bottom support plate; the positioning hole is a circular hole, and the positioning hole satisfies: 0.9≤(L1−R1)/(L2−R1)≤1.1, wherein R1 is a radius of the positioning hole, and in the width direction of the bottom film, L1 is a distance from a center of the positioning hole to the first side and L2 is a distance from the center of the positioning hole to the second side.

5. The energy storage device of claim 1, wherein in the length direction of the bottom film, the second wrapping section exceeds the third side by a length N1, wherein 20 mm≤N1≤40 mm.

6. The energy storage device of claim 4, wherein the fourth wrapping section exceeds the third side by a length N2, and in the width direction of the bottom film, a length Y1 of the third side satisfies: 1.25≤(N1+N2)/Y1≤1.75.

7. The energy storage device of claim 1, wherein 2 mm≤M1≤6.25 mm.

8. The energy storage device of claim 1, wherein the electrode assembly is connected to the lower plastic, and the electrode assembly is wrapped by the insulation film; the electrode assembly, the insulation film, and the lower plastic are accommodated in the housing, and the housing is connected to the cover plate; and the cover plate further comprises a first curved surface, and the lower plastic further comprises a second curved surface; two ends of the first curved surface are respectively connected to the first outer side surface and the second outer side surface, and two ends of the second curved surface are respectively connected to the third outer side surface and the fourth outer side surface; and the first curved surface exceeds the second curved surface, a distance between the first curved surface and the second curved surface is H3, and the cover plate and the lower plastic satisfy: 1.15<H3/H1≤1.85.

9. The energy storage device of claim 1, wherein the first wrapping section or the third wrapping section is connected to the third outer side surface, and the second wrapping section and the fourth wrapping section are both connected to the fourth outer side surface; in a width direction of the cover plate, a distance between the first outer side surface and the third outer side surface is H1; in a length direction of the cover plate, a distance between the second outer side surface and the fourth outer side surface is H2; and the cover plate and the lower plastic satisfy: 1<H2/H1≤1.25.

10. An electricity-consumption device, comprising an energy storage device, wherein the energy storage device is configured to provide electrical energy for the electricity-consumption device;

wherein the energy storage device comprises an insulation film and an electrode assembly, the electrode assembly is wrapped by the insulation film, and the insulation film comprises a bottom film, a first side film, and a second side film;

the bottom film comprises a first side, a second side, and a third side, wherein the first side is opposite to the second side in a width direction of the bottom film, and the third side is connected to the first side and the second side;

the first side film is connected to the first side, and the first side film comprises a first wrapping section and a second wrapping section connected to the first wrapping section in a length direction of the bottom film; and the first wrapping section is connected to the first side, and the second wrapping section exceeds the third side in the length direction of the bottom film;

the second side film is connected to the second side, and the first side film comprises a third wrapping section and a fourth wrapping section connected to the third wrapping section in the length direction of the bottom film; and the third wrapping section is connected to the second side, and the fourth wrapping section exceeds the third side in the length direction of the bottom film;

the bottom film, the first side film, and the second side film are integrally formed;

when the electrode assembly is wrapped by the insulation film, the first side film is folded relative to the bottom film along the first side, the second side film is folded relative to the bottom film along the second side, the second wrapping section is folded relative to the first wrapping section, the fourth wrapping section is folded relative to the third wrapping section, and the second wrapping section and the fourth wrapping section are connected and at least partially overlapped;

a first groove and a second groove are defined on the third side, the first groove extends along the first side, and the second groove extends along the second side; the first groove is defined between the bottom film and the first side film, and the second groove is defined between the bottom film and the second side film; and the first side film further comprises a first bending section defined by the first groove, and the second side film further comprises a second bending section defined by the second groove; in the length direction of the bottom film, two opposite sides of the first bending section are respectively connected to the first wrapping section and the second wrapping section, and two opposite sides of the second bending section are respectively connected to the third wrapping section and the fourth wrapping section; and when the electrode assembly is wrapped by the insulation film, the first bending section and the second bending section are bent and deformed, to make the second wrapping section folded relative to the first wrapping section and the fourth wrapping section folded relative to the third wrapping section;

the second wrapping section has a first cutting edge facing away from the first wrapping section and close to the fourth wrapping section, and the fourth wrapping section has a second cutting edge facing away from the third wrapping section and close to the second wrapping section; and the first cutting edge is angled relative to the third side, and the second cutting edge is angled relative to the third side;

the first cutting edge and the third side define an angle $\alpha$, and the second cutting edge and the third side define an angle $\beta$, wherein $1°\leq\alpha\leq8°$, and $1°\leq\beta\leq8°$;

in the length direction of the bottom film, the first bending section has a length M1, and the second bending section has a length M2, wherein 1.75 mm≤M1≤10.35 mm, and 0.9≤M1/M2≤1.1;

in the width direction of the bottom film, the bottom film further comprises a third bending section and a fourth bending section facing away from each other; the first side is located at the third bending section, the second side is located at the fourth bending section, and in the width direction of the bottom film, the third bending section has a width M3, and the fourth bending section has a width M4, wherein 1 mm≤M3≤2.55 mm, and 0.9≤M3/M4≤1.1;

the energy storage device further comprises a cover plate, a lower plastic, and a housing, wherein the cover plate comprises a first outer side surface and a second outer side surface that are connected at an angle; the lower plastic is connected to the cover plate, the lower plastic comprises a third outer side surface facing the same direction as the first outer side surface, and a fourth outer side surface facing the same direction as the second outer side surface; the third outer side surface is connected to the fourth outer side surface, the first outer side surface exceeds the third outer side surface, and the second outer side surface exceeds the fourth outer side surface;

the third outer side surface has a first bonding region, the fourth outer side surface has a second bonding region, and the insulation film is connected to the first bonding region and the second bonding region; in a thickness direction of the lower plastic, the first bonding region is located at an end of the third outer side surface away from the cover plate, the second bonding region is located at an end of the fourth outer side surface away from the cover plate; and an edge of the first bonding region is spaced apart from the cover plate by a distance S1, wherein 1.55 mm≤S1≤2.85 mm.

11. The electricity-consumption device of claim 10, wherein a bottom wall of the first groove and a bottom wall of the second groove each have an arc-shaped contour.

12. The electricity-consumption device of claim 10, wherein the first side is connected to the third side in an arc connection manner, and the second side is connected to the third side in an arc connection manner.

13. The electricity-consumption device of claim 10, wherein the energy storage device further comprises a bottom support plate, wherein the bottom film defines a positioning hole penetrating the bottom film, and the positioning hole is configured to position and install the bottom support plate; the positioning hole is a circular hole, and the positioning hole satisfies: 0.9≤(L1−R1)/(L2−R1)≤1.1, wherein R1 is a radius of the positioning hole, and in the width direction of the bottom film, L1 is a distance from a center of the positioning hole to the first side and L2 is a distance from the center of the positioning hole to the second side.

14. The electricity-consumption device, of claim 10, wherein in the length direction of the bottom film, the second wrapping section exceeds the third side by a length N1, wherein 20 mm≤N1≤40 mm.

15. The electricity-consumption device of claim 13, wherein the fourth wrapping section exceeds the third side by a length N2, and in the width direction of the bottom film, a length Y1 of the third side satisfies: 1.25≤(N1+N2)/Y1≤1.75.

16. The electricity-consumption device of claim 10, wherein 2 mm≤M1≤6.25 mm.

17. The electricity-consumption device of claim 10, wherein the electrode assembly is connected to the lower plastic, and the electrode assembly is wrapped by the insulation film; the electrode assembly, the insulation film, and the lower plastic are accommodated in the housing, and the housing is connected to the cover plate; and the cover plate further comprises a first curved surface, and the lower plastic further comprises a second curved surface; two ends of the first curved surface are respectively connected to the first outer side surface and the second outer side surface, and two ends of the second curved surface are respectively connected to the third outer side surface and the fourth outer side surface; and the first curved surface exceeds the second curved surface, a distance between the first curved surface and the second curved surface is H3, and the cover plate and the lower plastic satisfy: $1.15<H3/H1\leq1.85$.

18. The electricity-consumption device of claim 10, wherein the first wrapping section or the third wrapping section is connected to the third outer side surface, and the second wrapping section and the fourth wrapping section are both connected to the fourth outer side surface; in a width direction of the cover plate, a distance between the first outer side surface and the third outer side surface is H1; in a length direction of the cover plate, a distance between the second outer side surface and the fourth outer side surface is H2; and the cover plate and the lower plastic satisfy: $1<H2/H1\leq1.25$.

\* \* \* \* \*